(12) United States Patent
Takeda

(10) Patent No.: US 11,627,275 B2
(45) Date of Patent: *Apr. 11, 2023

(54) SOLID-STATE IMAGING DEVICE AND METHOD OF OPERATING THE SAME, AND ELECTRONIC APPARATUS AND METHOD OF OPERATING THE SAME

(71) Applicant: Sony Semiconductor Solutions Corporation, Kanagawa (JP)

(72) Inventor: Takeshi Takeda, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/371,928

(22) Filed: Jul. 9, 2021

(65) Prior Publication Data

US 2021/0409633 A1  Dec. 30, 2021

Related U.S. Application Data

(63) Continuation of application No. 16/722,629, filed on Dec. 20, 2019, now Pat. No. 11,070,760, which is a
(Continued)

(30) Foreign Application Priority Data

Sep. 25, 2013 (JP) ................................ 2013-197874

(51) Int. Cl.
*H04N 5/378* (2011.01)
*H04N 5/3745* (2011.01)
(Continued)

(52) U.S. Cl.
CPC .......... *H04N 5/378* (2013.01); *H04N 5/3559* (2013.01); *H04N 5/3597* (2013.01);
(Continued)

(58) Field of Classification Search
CPC .... H04N 5/3559; H04N 5/3698; H04N 5/378; H04N 5/37452
(Continued)

(56) References Cited

U.S. PATENT DOCUMENTS 4,139,782 A    2/1979  Ablassmeier
7,952,121 B2   5/2011  Arimoto
(Continued)

FOREIGN PATENT DOCUMENTS

CN     102208423 A    10/2011
JP     2003-087663 A   3/2003
(Continued)

OTHER PUBLICATIONS

Japanese Office Action dated Dec. 27, 2016, for corresponding Japanese Application No. 2013-197874.
(Continued)

*Primary Examiner* — Christopher K Peterson
(74) *Attorney, Agent, or Firm* — Michael Best & Friedrich LLP

(57) ABSTRACT

A solid-state imaging device includes a plurality of pixels in a two-dimensional array. Each pixel includes a photoelectric conversion element that converts incident light into electric charge, and a charge holding element that receives the electric charge from the photoelectric conversion element, and transfers the electric charge to a corresponding floating diffusion. The charge holding element further includes a plurality of electrodes.

19 Claims, 29 Drawing Sheets

Related U.S. Application Data continuation of application No. 16/132,903, filed on Sep. 17, 2018, now Pat. No. 10,574,924, which is a continuation of application No. 15/814,741, filed on Nov. 16, 2017, now Pat. No. 10,104,327, which is a continuation of application No. 15/397,252, filed on Jan. 3, 2017, now Pat. No. 9,832,410, which is a continuation of application No. 14/950,715, filed on Nov. 24, 2015, now Pat. No. 9,571,776, which is a continuation of application No. 14/492,643, filed on Sep. 22, 2014, now Pat. No. 9,282,262.

(51) Int. Cl.
 H04N 5/359 (2011.01)
 H04N 5/355 (2011.01)
 H04N 5/369 (2011.01)

(52) U.S. Cl.
 CPC ......... *H04N 5/3698* (2013.01); *H04N 5/3745* (2013.01); *H04N 5/37452* (2013.01)

(58) Field of Classification Search
 USPC .................................................. 348/300–308
 See application file for complete search history.

(56) References Cited

U.S. PATENT DOCUMENTS

| | | | | |
|---|---|---|---|---|
| 9,040,890 | B2 | 5/2015 | Fereyre | |
| 9,282,262 | B2* | 3/2016 | Takeda | H04N 5/3597 |
| 9,571,776 | B2* | 2/2017 | Takeda | H04N 5/3698 |
| 9,832,410 | B2* | 11/2017 | Takeda | H04N 5/378 |
| 10,104,327 | B2* | 10/2018 | Takeda | H04N 5/3745 |
| 10,574,924 | B2* | 2/2020 | Takeda | H04N 5/3745 |
| 11,070,760 | B2* | 7/2021 | Takeda | H04N 5/3745 |
| 2005/0219884 | A1 | 10/2005 | Manabe et al. | |
| 2008/0048212 | A1 | 2/2008 | Nakashima | |
| 2009/0057724 | A1 | 3/2009 | Arimoto et al. | |
| 2010/0013973 | A1 | 1/2010 | Adkisson et al. | |
| 2010/0188543 | A1 | 7/2010 | Oike | |
| 2010/0238334 | A1 | 9/2010 | Takahashi | |
| 2011/0217315 | A1 | 9/2011 | Schwartz et al. | |
| 2011/0234836 | A1 | 9/2011 | Machida | |
| 2011/0242389 | A1* | 10/2011 | Takatsuka | H04N 5/3575 348/311 |
| 2012/0057056 | A1 | 3/2012 | Oike | |
| 2012/0199933 | A1* | 8/2012 | Kobayashi | H01L 27/14609 257/E31.093 |
| 2013/0258151 | A1 | 10/2013 | Ayers et al. | |
| 2014/0002702 | A1 | 1/2014 | Ikedo et al. | |
| 2014/0014816 | A1 | 1/2014 | Takeda | |
| 2014/0084143 | A1 | 3/2014 | Sakano | |
| 2014/0347538 | A1 | 11/2014 | Toda | |
| 2015/0028189 | A1 | 1/2015 | Hagiwara et al. | |

FOREIGN PATENT DOCUMENTS

| | | |
|---|---|---|
| JP | 2008-060550 A | 5/2008 |
| JP | 2008-103647 A | 5/2008 |
| JP | 2010-040572 A | 2/2010 |
| JP | 2010-056430 A | 3/2010 |
| JP | 2011-040657 A | 2/2011 |
| JP | 2011-216673 A | 10/2011 |
| JP | 2011-217315 A | 10/2011 |
| JP | 2013-005397 A | 1/2013 |

OTHER PUBLICATIONS

Chinese Office Action dated Apr. 10, 2018, for corresponding Chinese application No. 201410476713.5.

* cited by examiner

SOLID-STATE IMAGING DEVICE AND METHOD OF OPERATING THE SAME, AND ELECTRONIC APPARATUS AND METHOD OF OPERATING THE SAME

CROSS REFERENCE TO RELATED APPLICATIONS

The present application is a Continuation of application Ser. No. 16/722,629, filed Dec. 20, 2019, which is a Continuation of application Ser. No. 16/132,903, filed Sep. 17, 2018, now U.S. Pat. No. 10,574,924, issued on Feb. 25, 2020, which is a Continuation of application Ser. No. 15/814,741, filed Nov. 16, 2017, now U.S. Pat. No. 10,104,327, issued on Oct. 16, 2018, which is a Continuation of application Ser. No. 15/397,252, filed Jan. 3, 2017, now U.S. Pat. No. 9,832,410, issued on Nov. 28, 2017, which is a Continuation of application Ser. No. 14/950,715, filed Nov. 24, 2015, now U.S. Pat. No. 9,571,776, issued on Feb. 14, 2017, which is a Continuation of application Ser. No. 14/492,643, filed Sep. 22, 2014, now U.S. Pat. No. 9,282,262, issued on Mar. 8, 2016, which claims the benefit of Japanese Priority Patent Application JP 2013-197874 filed Sep. 25, 2013, the entire contents of which are incorporated herein by reference in their entirety.

BACKGROUND

The present disclosure relates to a solid-state imaging device and a method of operating the same, and an electronic apparatus and a method of operating the same, and more particularly, to a solid-state imaging device and a method of operating the same, and an electronic apparatus and a method of operating the same which are capable of holding charge generated by light reception of a photodiode in a holding unit which is constituted by a plurality of electrodes and capable of reliably transmitting the held charge by partially generating a strong electric field by control of turning-on or turning-off for each electrode.

A rolling shutter type device that sequentially reads out photoelectric conversion electrons for each pixel is generally used as a complementary metal oxide semiconductor (CMOS) type image sensor.

However, in the rolling shutter type device, since there is no temporal simultaneity between timings when imaging is performed in pixels constituting an image, an image obtained by capturing a subject operating at a high speed may be distorted. For this reason, a global shutter (GS) type device has been suggested which simultaneously transmits photoelectrically-converted charge to another holding unit to hold the charge and then sequentially reads out the charge from the holding unit (MEM) (see Japanese Unexamined Patent Application Publication No. 2008-103647).

SUMMARY

Incidentally, in the structure disclosed in Japanese Unexamined Patent Application Publication No. 2008-103647, an attempt to form a holding unit (charge holding unit) which holds large-capacity charge results in an increase in the size thereof.

In such a structure, when there is an attempt to transmit charge generated by a light receiving element to a floating diffusion, an impurity profile is generally formed so as to be capable of forming a sufficient electric field between a near-field region and a far-field region of the floating diffusion in the holding unit.

However, when a transmission distance is increased in a situation where a predetermined sufficient electric field is maintained, so-called reset voltages for depleting the holding unit increase, which results in an increase in power consumption.

The present disclosure is contrived in view of such a situation, and particularly, it is desirable to reliably transmit charge held in a holding unit to a floating diffusion without unnecessarily increasing a reset voltage generated in association with an increase in the size of the holding unit.

An imaging device according to a first illustrative example of the present disclosure may include a plurality of pixels in a two-dimensional array, each including: a photoelectric conversion element that converts incident light into an electric charge; and a charge holding element that receives the electric charge from the photoelectric conversion element, and transfers the electric charge to a corresponding floating diffusion. For each of the plurality of pixels, the charge holding element may include a plurality of electrodes.

The imaging device of the first illustrative example may further include a control circuit that controls operations of the plurality of pixels. The control circuit may be configured to cause the charge holding element of a given pixel of the plurality of pixels to transfer the electric charge held therein to the corresponding floating diffusion by sequentially supplying an OFF potential to the plurality of electrodes of the given pixel.

The control circuit may be configured to drive the plurality of pixels to perform a global shutter imaging operation.

In the imaging device of the first illustrative example, the plurality of pixels may be grouped into units each comprising j pixels, j being an integer greater than 1, where each of the pixels that is included in a same unit corresponds to a same floating diffusion.

The control circuit may be configured to cause a given unit to perform an additive readout operation that may include transferring the electric charges held in the respective charge holding elements of each of the pixels of the given unit to the corresponding floating diffusion such that the corresponding floating diffusion adds together the electric charges transferred from the pixels of the given unit.

The control circuit may be configured to cause a given unit to perform a partial additive readout operation, which may include: for each of the pixels of the given unit, turning on less than all of the plurality of electrodes of the charge holding element of the respective pixel while the charge holding element of the respective pixel receives the electric charge from the photoelectric conversion element of the respective pixel, and transferring the electric charges held in the respective charge holding elements of each of the pixels of the given unit to the corresponding floating diffusion such that the corresponding floating diffusion adds together the electric charges transferred from the pixels of the given unit.

The control circuit may be configured selectively read out a given unit according to one of a plurality of readout modes that the control circuit may be configured to selectively switch between, the plurality of readout modes including: an individual pixel readout mode in which the electric charge of the charge holding element of each pixel of the given unit is read out individually, an additive readout mode in which the electric charge of the charge holding element of each pixel of the given unit is added together by the corresponding floating diffusion and read out collectively, and a partial additive readout mode in which, for each of the pixels of the given unit, less than all of the plurality of electrodes of the charge holding element of the respective pixel are turned on while the charge holding element of the respective pixel receives the electric charge from the photoelectric conversion element of the respective pixel and the electric charge of the charge holding element of each pixel of the given unit is added together by the corresponding floating diffusion and read out collectively.

The control circuit may be configured to cause a given pixel of the plurality of pixels to perform a partial readout operation that includes turning on less than all of the plurality of electrodes of the charge holding element of the given pixel while the charge holding element of the given pixel receives the electric charge from the photoelectric conversion element of the given pixel.

Each of the plurality of pixel may include a first transfer gate that selectively electrically separates the photoelectric conversion element of the respective pixel from the charge holding element of the respective pixel, and a second transfer gate that selectively electrically separates the charge holding element of the respective pixel from the corresponding floating diffusion.

The charge holding element may include a plurality of sub-regions each corresponding to one of the plurality of electrodes. The plurality of sub-regions may be arranged in series between the first and second transfer gates. The plurality of sub-regions may be arranged such that each adjoins the photoelectric conversion element of the respective pixel with no other one of the plurality of sub-regions intervening therebetween.

The plurality of sub-regions may be arranged such that a first direction is transverse to a second direction, the first direction is a direction in which charge is transferred into the charge holding element through the first transfer gate, and the second direction is a direction in which charge is transferred out from the charge holding element through the second transfer gate.

The charge holding element may include a plurality of sub-regions each corresponding to one of the plurality of electrodes, the plurality of sub-regions may be arranged such that a first direction is transverse to a second direction, the first direction is a direction in which charge is transferred into the charge holding element, and the second direction is a direction in which charge is transferred out from the charge holding element.

The charge holding element of each of the plurality of pixels may be configured such that at least one of the plurality of electrodes thereof also controls transfer of the electric charge from the photoelectric conversion element of the respective pixel to the charge holding element of the respective pixel.

For a given pixel of the plurality of pixels, at least one of the plurality of electrodes of the charge holding element thereof may be a different size from at least one other of the plurality of electrodes of the charge holding element thereof.

Each of the plurality of pixels may further include a photoelectric-conversion-element-reset gate that abuts the photoelectric conversion element and selectively connects the photoelectric conversion element to a reset drain.

Each of the plurality of pixels may further include a light shielding unit configured to shield the charge holding element from the incident light, and an electrode of at least one of the holding units may be directly electrically connected to the light shielding unit.

According to a second illustrative example of the present disclosure, a method of driving an imaging device that includes a plurality of pixels that each include a photoelectric conversion element that converts incident light into an electric charge and a charge holding element that receives the electric charge from the photoelectric conversion element, temporarily holds the electric charge, and transfers the electric charge to a corresponding floating diffusion, where for each of the plurality of pixels, the charge holding element includes a plurality of electrodes, may include: causing the charge holding element of a given pixel of the plurality of pixels to transfer the electric charge held therein to the corresponding floating diffusion by sequentially turning off the plurality of electrodes of the charge holding element of the given pixel.

The method may further include turning on less than all of the plurality of electrodes of the given pixel while the electric charge is received from the photoelectric conversion element by the charge holding element.

According to a third illustrative example of the present disclosure, an electronic apparatus may include an imaging device that includes a plurality of pixels in a two-dimensional array. The plurality of pixels may each include: a photoelectric conversion element that converts incident light into an electric charge; and a charge holding element that receives the electric charge from the photoelectric conversion element, and transfers the electric charge to a corresponding floating diffusion. The charge holding element may include a plurality of electrodes.

A solid-state imaging device according to an embodiment of the present disclosure includes a photodiode that receives light in pixel units and generates charge by photoelectric conversion, and a holding unit that includes electrodes divided into a plurality of pieces and temporarily holds the charge generated by the photodiode. The holding unit sequentially switches turning-on or turning-off of the divided electrodes to thereby transmit the held charge to a floating diffusion.

The solid-state imaging device may be a global shutter type solid-state imaging device.

The solid-state imaging device may further include an addition unit that adds the charge transmitted from the holding units of the plurality of pixels. Charge accumulated in a portion of the electrodes divided into a plurality of pieces may be transmitted to the floating diffusion. The addition unit may add the charge accumulated in the portion of the electrodes divided into a plurality of pieces by the plurality of pixels and then may transmit the charge.

The solid-state imaging device may further include a read-out electrode which is constituted by an electrode that controls the transmission of the charge generated by the photodiode to the holding unit. The read-out electrode may be configured in a direction perpendicular to a division direction of the electrodes divided into a plurality of pieces, which constitute the holding unit.

The plurality of divided electrodes constituting the holding unit may be divided so as to have substantially equal areas.

The plurality of divided electrodes constituting the holding unit may be divided so as to have unequal areas.

The holding unit may have a function of transmitting the charge generated by the photodiode to itself.

The solid-state imaging device may further include a global reset gate that controls turning-on or turning-off for directly discharging the charge of the photodiode to a reset drain.

The holding unit may include $SiO_2$, $SiN$, $HfO_2$, or $TaO_2$ and may be formed by a stack thereof.

A material of the electrode may be a metal material including Poly Si, PDAS, W, Mo, Al, or Cu.

The holding unit may further include a light-shielding unit, and any one of the electrodes divided into a plurality of pieces may be shorted to the light-shielding unit.

A method of operating a solid-state imaging device according to another embodiment of the present disclosure includes causing a photodiode to receive light in pixel units and to generate charge by photoelectric conversion, and causing a holding unit with electrodes divided into a plurality of pieces to temporarily hold the charge generated by the photodiode. The holding unit sequentially switches turning-on or turning-off of the divided electrodes to thereby transmit the held charge to a floating diffusion.

An electronic apparatus according to still another embodiment of the present disclosure is an electronic apparatus having a solid-state imaging device. The electronic apparatus includes a photodiode that receives light in pixel units and generates charge by photoelectric conversion, and a holding unit that includes electrodes divided into a plurality of pieces and temporarily holds the charge generated by the photodiode. The holding unit sequentially switches turning-on or turning-off of the divided electrodes to thereby transmit the held charge to a floating diffusion.

The solid-state imaging device may be a global shutter type solid-state imaging device.

The electronic apparatus may further include an addition unit that adds the charge transmitted from the holding units of the plurality of pixels. Charge accumulated in a portion of the electrodes divided into a plurality of pieces may be transmitted to the floating diffusion. The addition unit may add the charge accumulated in the portion of the electrodes divided into a plurality of pieces by the plurality of pixels and then may transmit the charge.

The electronic apparatus may further include a read-out electrode which is constituted by an electrode that controls the transmission of the charge generated by the photodiode to the holding unit. The read-out electrode may be configured in a direction perpendicular to a division direction of the electrodes divided into a plurality of pieces, which constitute the holding unit.

The plurality of divided electrodes constituting the holding unit may be divided so as to have substantially equal areas.

The plurality of divided electrodes constituting the holding unit may be divided so as to have unequal areas.

The holding unit may have a function of transmitting the charge generated by the photodiode to itself.

A method of operating an electronic apparatus according to still another embodiment of the present disclosure is a method of operating an electronic apparatus having a solid-state imaging device. The method includes causing a photodiode to receive light in pixel units and to generate charge by photoelectric conversion, and causing a holding unit with electrodes divided into a plurality of pieces to temporarily hold the charge generated by the photodiode. The holding unit sequentially switches turning-on or turning-off of the divided electrodes to thereby transmit the held charge to a floating diffusion.

In the embodiments of the present disclosure, light is received in pixel units, charge is generated in a photodiode by photoelectric conversion, the charge generated by the photodiode is temporarily held by a holding unit which is provided with electrodes divided into a plurality of pieces, and the turning-on or turning-off of the divided electrodes is sequentially switched by the holding unit, thereby transmitting the held charge to a floating diffusion.

According to the embodiments of the present disclosure, it is possible to reliably transmit charge held in a holding unit to an FD unit without unnecessarily increasing a reset voltage generated in association with an increase in the size of the holding unit.

DETAILED DESCRIPTION OF EMBODIMENTS

Hereinafter, embodiments for implementing the present disclosure (hereinafter, referred to as embodiments) will be described. The description thereof is made in the following order.

1. First Embodiment (an example of a case where a holding unit is divided into two pieces)
2. Second Embodiment (an example of a case where a holding unit is divided into four pieces)
3. Third Embodiment (an example of a case where a photodiode is disposed in a direction perpendicular to a direction in which a first holding unit to a fourth holding unit are divided)
4. Fourth Embodiment (an example of a case where pixel signals of four pixels are added)
5. Fifth Embodiment (an example of a case where a global reset gate is provided)
6. Sixth Embodiment (an example of a case where a holding unit is unequally divided)
7. Seventh Embodiment (an example of a case where a holding unit has a function of a transmission gate)

First Embodiment

Configuration Example of General Solid-State Imaging Device

Figure 1:
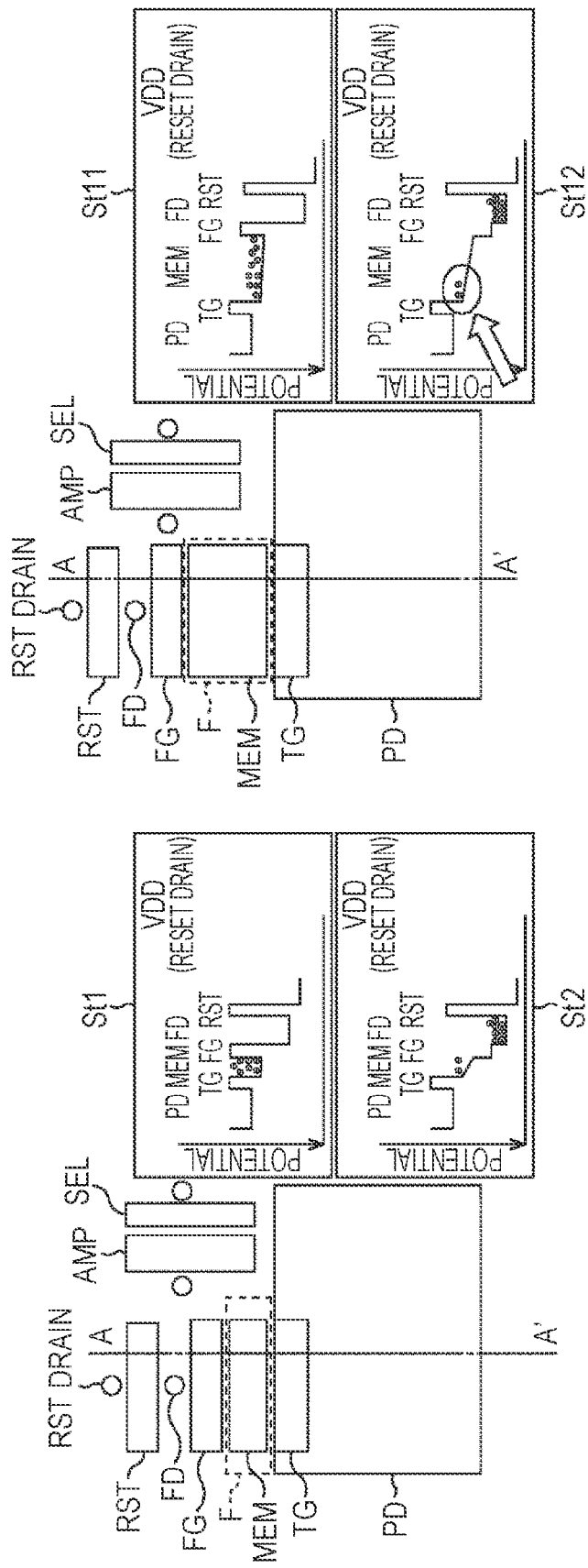
FIG. 1 is a diagram illustrating a configuration example of a general solid-state imaging device.

FIG. 1 is a top view showing a configuration example of a general solid-state imaging device in pixel units. The left side in FIG. 1 shows a configuration example of a solid-state imaging device of the related art, and the right side in FIG. 1 shows a configuration example of a solid-state imaging device that has become common in recent years.

The solid-state imaging device of the related art which is shown on the left side of FIG. 1 includes a photodiode PD, a transmission gate TG, a holding unit MEM, a floating gate FG, a floating diffusion FD, a reset gate RST, a reset drain RST Drain, an amplification unit AMP, and a selection unit SEL from the lowermost portion in FIG. 1.

The photodiode PD is constituted by a light receiving element, and generates charge corresponding to the amount of light by photoelectric conversion when light is received.

The transmission gate TG transmits charge accumulated in the photodiode PD to the holding unit MEM by control of turning-on or turning-off.

The holding unit MEM is controlled to be turned on or turned off, and thus functions as a gate. When the holding unit is controlled to be turned on, the holding unit temporarily holds charge transmitted through the transmission gate TG from the photodiode PD. In addition, the holding unit MEM is constituted by electrodes having these functions, and thus holds or transmits charge by a voltage to be applied to the electrodes.

That is, in a case where the holding unit MEM is turned on, the transmission gate TG transmits the charge accumulated in the photodiode PD to the holding unit MEM at the same timing with respect to all pixels when the turning-on of a shutter is controlled. As a result, charge serving as a pixel signal generated by the photodiode PD is held in the holding unit MEM at the same timing with respect to all pixels. A light shielding film F is provided in the holding unit MEM so as to shield the holding unit MEM from light. Thus, it is possible to block light coming around from the photodiode PD and to reliably hold the amount of light which is the same as the amount of light received in the photodiode PD.

The floating gate FG transmits the charge held in the holding unit MEM to the floating diffusion FD by control of turning-on or turning-off.

The amplification unit AMP amplifies a voltage of power supplied through the selection unit SEL at a predetermined magnification in accordance with the amount of charge transmitted to the floating diffusion FD, and then outputs the voltage as a pixel signal.

When a pixel signal is instructed to be transmitted by a control unit which is not shown in the drawing, the selection unit SEL supplies power supplied from a power source VDD to the amplification unit AMP.

The reset gate RST discharges the charge transmitted to the floating diffusion FD to the reset drain RST Drain by control of turning-on or turning-off.

In addition, the configuration example of the solid-state imaging device which is shown on the right side of FIG. 1 has a basic configuration similar to that of the solid-state imaging device on the left side, and thus the description thereof will be omitted. Incidentally, the solid-state imaging devices on the left side and the right side of FIG. 1 have different configurations in a holding capacitor that holds charge of the holding unit MEM. That is, the solid-state imaging device on the right side of FIG. 1 has an area which is physically larger than that on the left side, and thus the amount of charge capable of being held is increased. An increase in the size of the holding unit MEM is for the purpose of increasing the capacity of charge transmitted from the photodiode PD.

For example, in the solid-state imaging device on the left side of FIG. 1, charge is held in the holding unit MEM by both the transmission gate TG and the floating gate FG being turned off, as in state St1 shown on the upper right side of the left side of FIG. 1.

In this state, when the floating gate FG is turned on, the held charge is transmitted to the floating diffusion FD due to the influence of an electric field generated on the holding unit MEM by an impurity profile of an electrode constituting the holding unit MEM, as indicated by state St2. That is, the holding unit MEM is constituted by an electrode and a gate oxide film which constitutes a transmission path for transmitting charge in an electric field generated by the electrode. For example, in a case where the holding unit MEM is controlled to be turned on by the application of a voltage to the electrode, charge is held within the gate oxide film of the holding unit MEM when both the transmission gate TG and the floating gate FG are in an off state. At this time, an electric field is generated in the electrode of the holding unit MEM by the impurity profile, and thus a potential is inclined so as to be a left downward inclination in the drawing, as indicated by the state St1 of FIG. 1. For this reason, in the state St1, when the floating gate FG is turned on, the held charge is transmitted to the floating diffusion FD due to the influence of the inclination of the potential according to the electric field generated on the holding unit MEM, as indicated by the state St2.

In addition, each of the states St1, St2, St11, and St12 of FIG. 1 shows potential distribution in a cross-section taken along line A-A' in the top view of each of the right and left solid-state imaging devices of FIG. 1.

The holding unit MEM in recent years as shown on the right side of FIG. 1 is made to have large capacity by increasing the size of the electrode, and thus it is possible to accumulate charge in the holding unit MEM by an operation similar to that in the state St1, as indicated by the state St11. However, as indicated by the state St12, even when the floating gate FG is turned on similarly to a case of the state St2, a transmission distance is made long by an increase in the physical size of the electrode of the holding unit MEM. Accordingly, the inclination of the electric field on the holding unit MEM becomes gentle, and thus the entire charge which is held may not be transmitted to the floating diffusion FD, which results in the generation of remaining charge. That is, in the solid-state imaging device on the right side of FIG. 1, even when the floating gate FG is turned on, the inclination of the potential on the holding unit MEM becomes gentle. Accordingly, the entire charge which is held has a tendency not to be transmitted to the floating diffusion FD, which may lead to the generation of remaining charge on the holding unit MEM.

In addition, even in such a case, a configuration can also be adopted in which a stronger electric field is generated by adjusting the impurity profile of the holding unit MEM. However, in this configuration, it is necessary to set a strong reset voltage, which results in a concern of an increase in power consumption.

In FIG. 1, the magnitude of the change in potential on the holding unit MEM in the states St2 and St12, that is, the magnitude of the inclination of the potential distribution indicates electric field intensity. That is, in the state St12, the inclination of the potential on the holding unit MEM is gentler than the inclination in the state St2, that is, the electric field intensity is weak, and thus a state where the held charge has a tendency not to be transmitted to the floating diffusion FD is shown.

Figure 2:
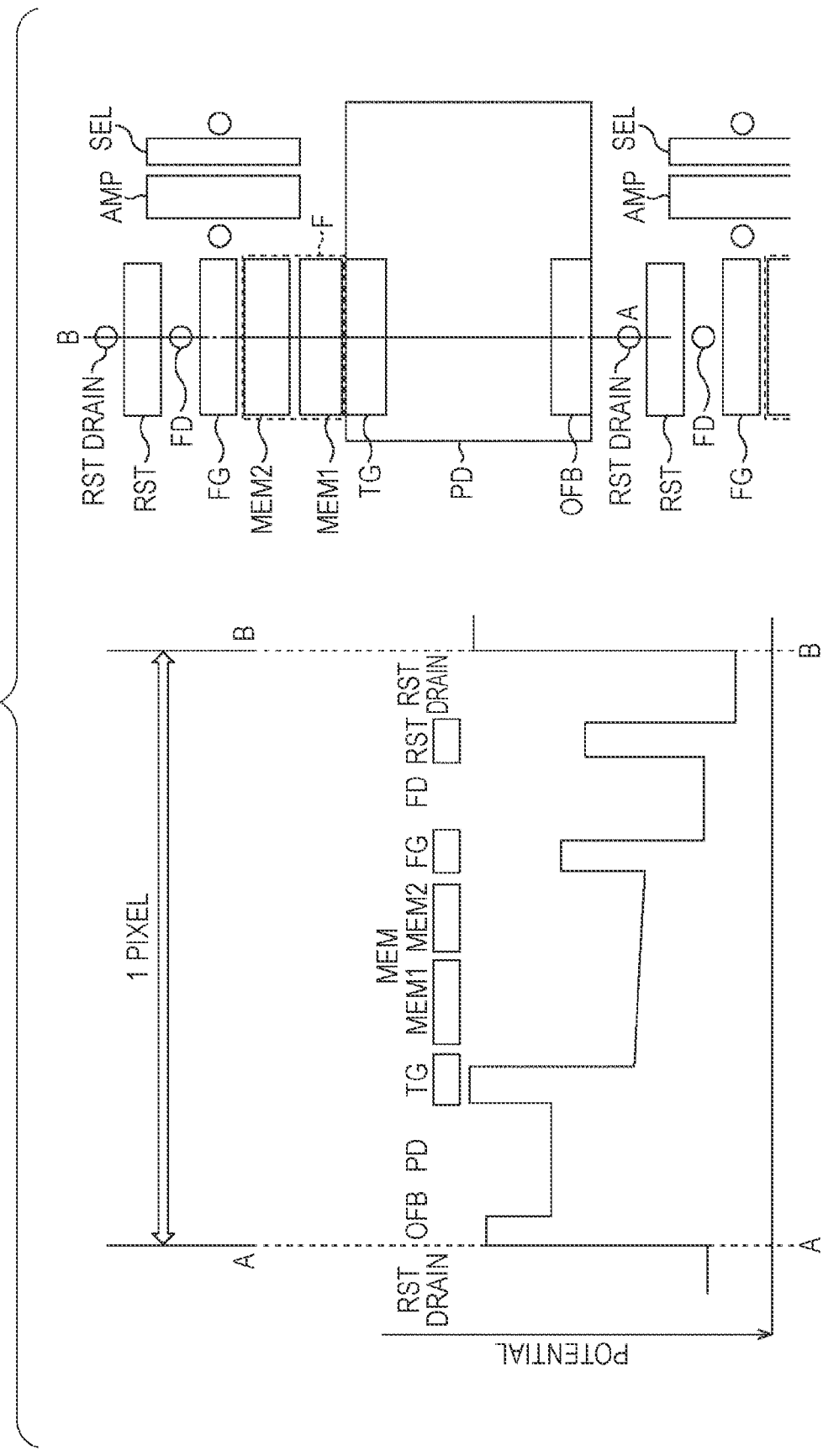
FIG. 2 is a diagram illustrating a configuration example of a solid-state imaging device according to a first embodiment to which the present disclosure is applied.

Configuration Example of Solid-State Imaging Device according to First Embodiment Consequently, in the solid-state imaging device to which the present disclosure is applied, as shown in FIG. 2, an electrode constituting the holding unit MEM is divided into a plurality of pieces.

The right side of FIG. 2 is a top view showing a configuration example of a solid-state imaging device in pixel units to which the present disclosure is applied. In addition, the left side of FIG. 2 shows an example of potential distribution in a cross-section taken along line A-B on the right side of FIG. 2. In the solid-state imaging device shown on the right side of FIG. 2, components having the same functions as those of the solid-state imaging device of FIG. 1 will be given the same reference numerals, signs and names, and the description thereof will be appropriately omitted.

That is, the solid-state imaging device of FIG. 2 is different from the solid-state imaging device of FIG. 1 in that an electrode constituting a holding unit MEM is equally divided into a plurality of pieces to provide a first holding unit MEM1 and a second holding unit MEM2, and in that an overflow discharge portion OFB is provided.

The size of the holding unit is increased as a whole by providing the first holding unit MEM1 and the second holding unit MEM2, and the held charge is more reliably transmitted to a floating diffusion FD by the control thereof. In addition, the overflow discharge portion OFB functions as a gate of a predetermined potential, and extra charge exceeding the amount of charge capable of being accumulated in a photodiode PD is discharged to a reset drain RST Drain in the adjacent pixel.

In addition, the left side of FIG. 2 shows a state where a transmission gate TG, a floating gate FG, and a reset gate RST are turned off and the first holding unit MEM1 and the second holding unit MEM2 are turned on. That is, for example, a state is shown in which charge that was accumulated in the photodiode PD is held in the first holding unit MEM1 and the second holding unit MEM2 after having been transmitted through the transmission gate TG.

Circuit Configuration of Solid-State Imaging Device of FIG. 2

Next, a circuit configuration example of the solid-state imaging device of FIG. 2 will be described with reference to FIG. 3.

Figure 3:
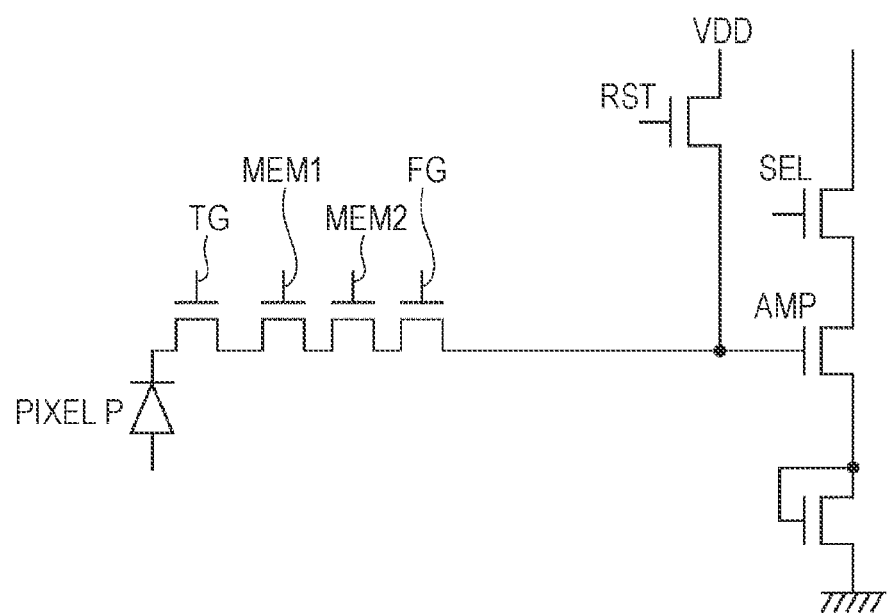
FIG. 3 is a diagram illustrating a circuit configuration example of the solid-state imaging device of FIG. 2.

In a circuit configuration example of a solid-state imaging device of FIG. 3, sources and drains of the transmission gate TG, the first holding unit MEM1, the second holding unit MEM2, the floating gate FG, and the reset gate RST are connected in series to a cathode of a photodiode of a pixel P. In addition, a gate of an amplification unit AMP is connected between the floating gate FG and the reset gate RST. A selection unit SEL controls the supply of power, supplied from the power source VDD, to the amplification unit AMP by control of turning-on or turning-off.

With such a configuration, the transmission gate TG transmits the charge accumulated in the photodiode PD of the pixel P to the first holding unit MEM1 and the second holding unit MEM2 for a predetermined period of time from a timing when an operation to control a shutter, not shown in the drawing, is made.

Further, in a state where the selection unit SEL is turned on, when the reset gate RST is turned off and the floating gate FG is turned on, the amplification unit AMP amplifies a voltage supplied from the power source VDD in accordance with the amount of charge transmitted from the holding unit MEM2, and then outputs the voltage as a pixel signal.

With such a configuration, the turning-on or turning-off of the first holding unit MEM1 and the second holding unit MEM2 is sequentially switched and controlled, and thus it is possible to increase the amount of charge capable of being held by increasing the electrode areas of the first holding unit MEM1 and the second holding unit MEM2 as a whole. In addition, the electrode constituting each of the first holding unit MEM1 and the second holding unit MEM2 is controlled so as to increase the electric field intensity, thereby transmitting the held charge. Thus, it is possible to temporarily hold the charge accumulated in the photodiode PD and to reliably transmit the total amount of charge held to the floating diffusion FD.

Charge accumulation transmission process Using Solid-State Imaging Device of FIG. 2

Figure 4:
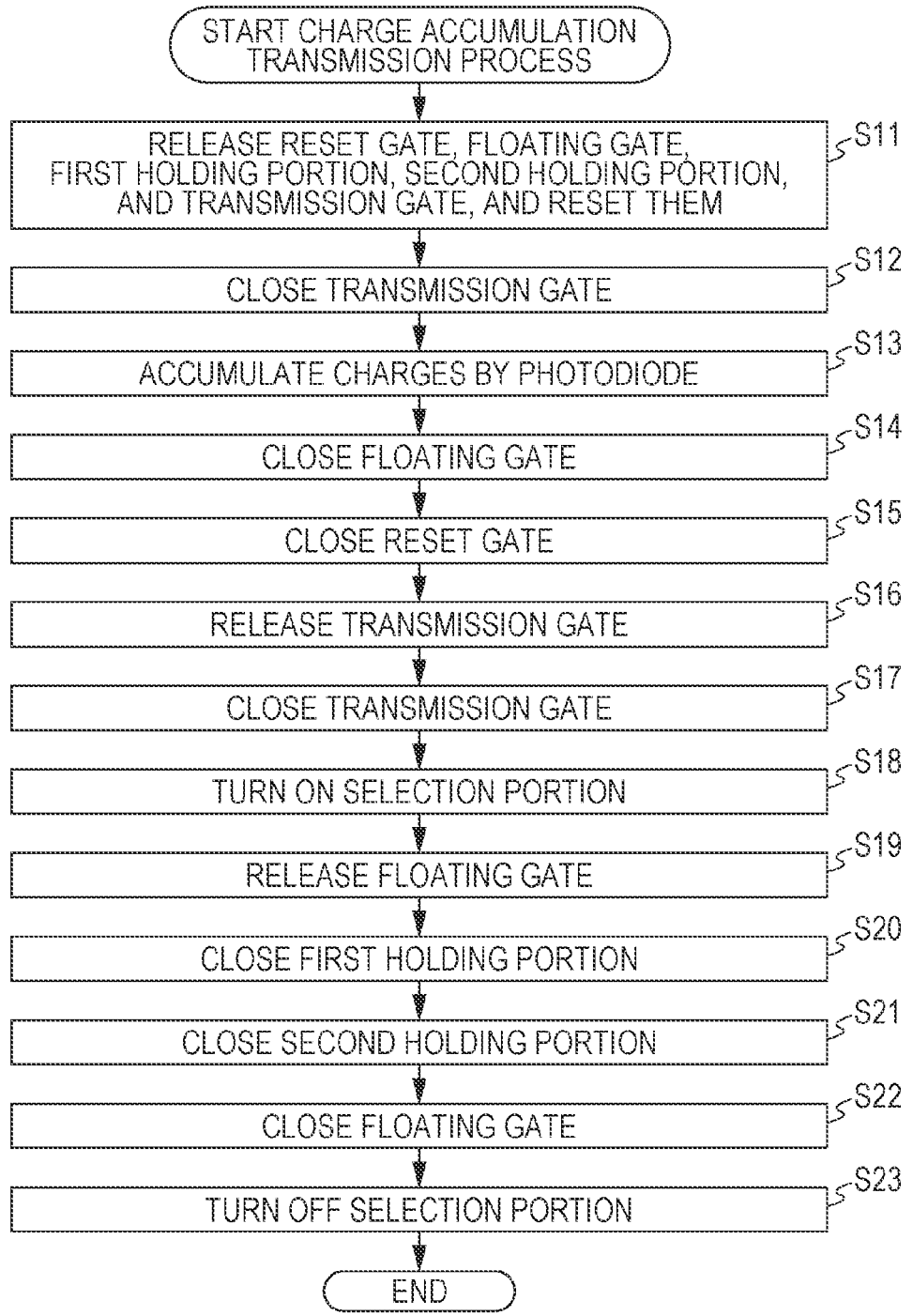
FIG. 4 is a flow chart illustrating a charge accumulation transmission process using the solid-state imaging device of FIG. 2.
Figure 5:
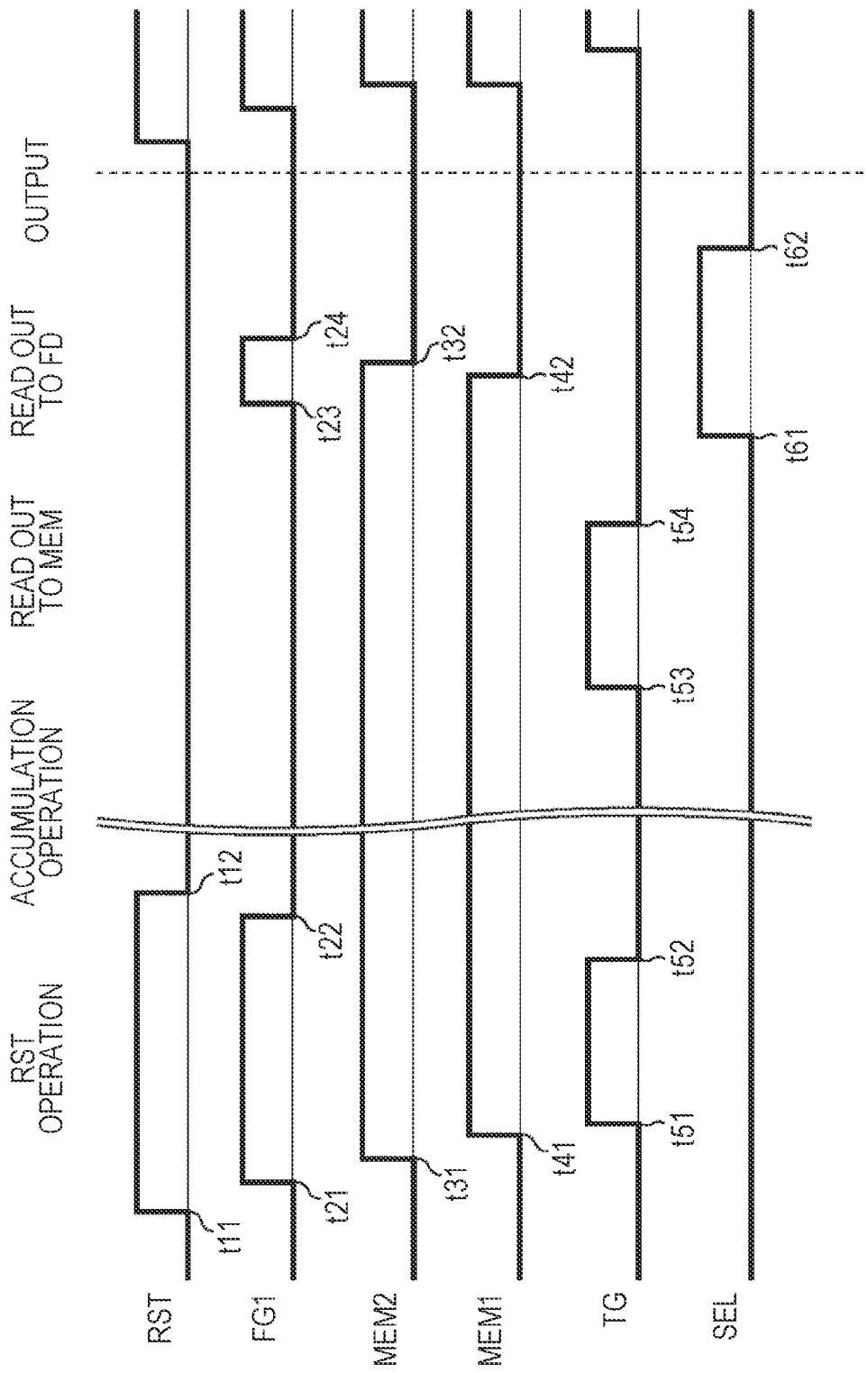
FIG. 5 is a timing chart illustrating the charge accumulation transmission process using the solid-state imaging device of FIG. 2.

Next, a charge accumulation transmission process of the solid-state imaging device of FIG. 2 will be described with reference to a flow chart of FIG. 4 and a timing chart of FIG. 5. In addition, FIG. 5 shows a control state at a timing of the turning-on (High) or turning-off (Low) of each of the reset gate RST, the floating gate FG, the second holding unit MEM2, the first holding unit MEM1, the transmission gate TG, and the selection unit SEL from above. Although this configuration in which a high potential corresponds to turning-on the pixel component and the low potential corresponds to turning off the pixel component is illustrated in FIG. 5 and throughout this disclosure for the sake of simplicity, it should be noted that alternative configurations are within the scope of this disclosure. For example, configurations in which the aforementioned components are turned on by a low potential and turned off by a high potential or configurations in which a mixture of components that are turned on by a high potential and components that components are turned off by a high potential are within the scope of this disclosure. These alternative configurations can be achieved by substitution of appropriate components as known in the art (e.g., substituting p-type transistors for n-type transistors, etc.)

In step S11, the reset gate RST, the floating gate FG, the second holding unit MEM2, the first holding unit MEM1, and the transmission gate TG are sequentially controlled to be turned on in this order, and thus the accumulated charge is released.

That is, as indicated by times t11, t21, t31, t41, and t51 of FIG. 5, the reset gate RST, the floating gate FG, the second holding unit MEM2, the first holding unit MEM1, and the transmission gate TG are controlled to be turned on (opened), and thus the accumulated charge is released, thereby executing a reset operation.

In step S12, as indicated by time t52 of FIG. 5, the transmission gate TG is turned off (closed).

In step S13, the turning off (closing) of the transmission gate TG starts an accumulation operation of accumulating the charge generated by the photodiode PD.

In step S14, as indicated by time t22 of FIG. 5, the floating gate FG is turned off (closed), and thus a state where the charge can be held in the first holding unit MEM1 and the second holding unit MEM2 is set.

In step S15, at time t12 of FIG. 5, the reset gate RST is turned off (closed), and thus a state where the charge can be accumulated in the floating diffusion FD is set.

Figure 6:
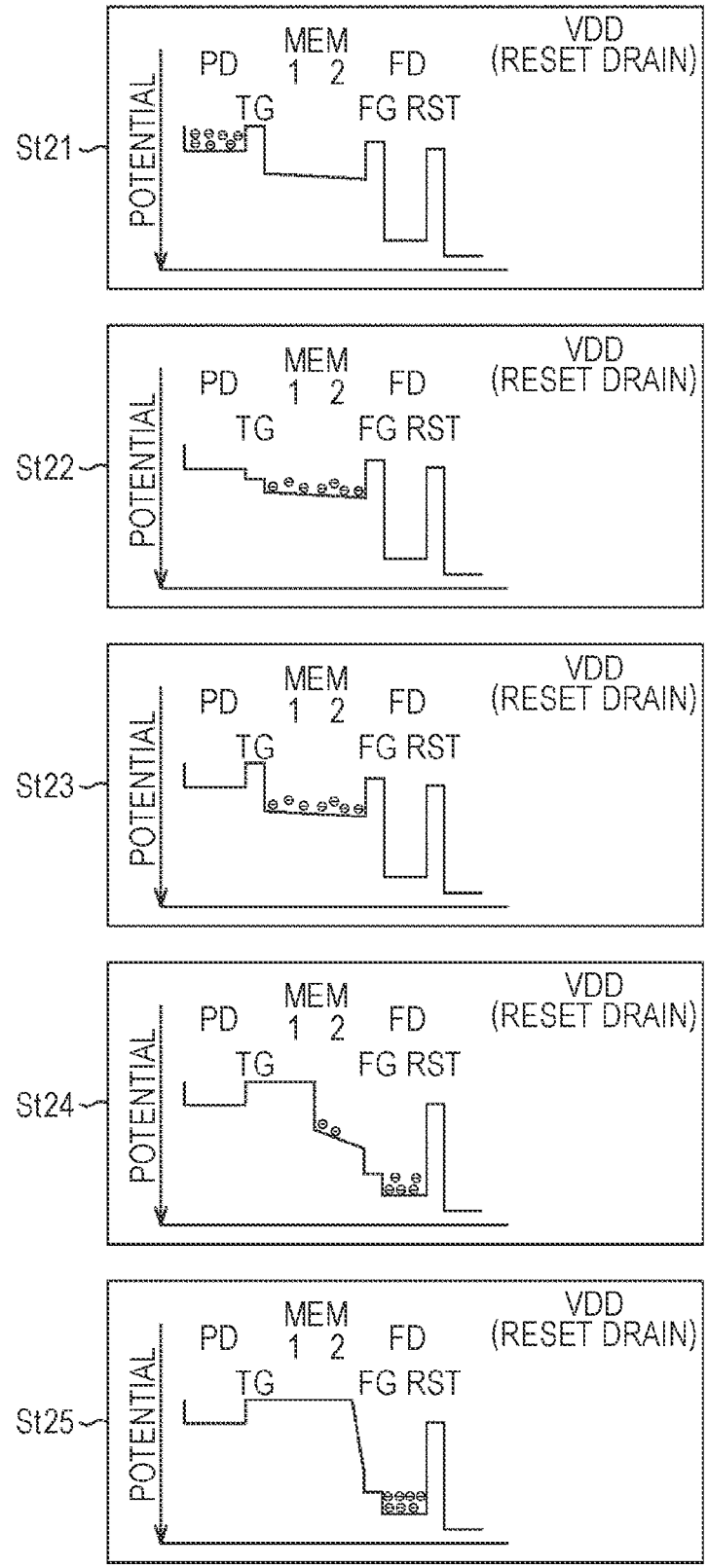
FIG. 6 is a state diagram illustrating the charge accumulation transmission process using the solid-state imaging device of FIG. 2.

As described above, as indicated by state St21 of FIG. 6, a state where charge is accumulated in the photodiode PD is set by a series of processes of the steps S11 to S15. In addition, all the states St21 to St25 of FIG. 6 show potential distribution as shown on the left side of FIG. 2.

In step S16, as indicated by time t53 of FIG. 5, the transmission gate TG is controlled to be turned on, and thus the transmission gate TG is released (opened). As a result, as indicated by the state St22 of FIG. 6, the charge accumulated in the photodiode PD is transmitted to the first holding unit MEM1 and the second holding unit MEM2.

In step S17, as indicated by time t54 of FIG. 5, the transmission gate TG is controlled to be turned off, and thus the transmission gate TG is closed. As a result, as indicated by the state St23 of FIG. 6, the charge accumulated in the photodiode PD is read out to the first holding unit MEM1 and the second holding unit MEM2, and the charge is held in the first holding unit MEM1 and the second holding unit MEM2. In addition, the state indicated by the state St23 is similar to the state shown on the left side of FIG. 2.

In step S18, as indicated by time t61 of FIG. 5, the selection unit SEL is turned on, and thus a state is set in which a voltage corresponding to the charge accumulated in the floating diffusion FD is output as a pixel signal from the amplification unit AMP. However, in this stage, since charge is not accumulated in the floating diffusion FD, there is no pixel signal to be output from the amplification unit AMP.

In step S19, as indicated by the time t23 of FIG. 5, the floating gate FG is turned on (opened), and thus the charge held in the first holding unit MEM1 and the second holding unit MEM2 is read out to the floating diffusion FD.

In step S20, at time t42 of FIG. 5, the first holding unit MEM1 is turned off, and thus the first holding unit MEM1 is closed. That is, as indicated by the state St24 of FIG. 6, the first holding unit MEM1 is turned off (closed), and thus the electric field in the electrode of the second holding unit MEM2 is strengthened. Accordingly, the inclination of the potential becomes sharp, which leads to a state where the held charge has a tendency to be transmitted to the floating diffusion FD.

In step S21, at time t32 of FIG. 5, the second holding unit MEM2 is turned off, and thus the second holding unit MEM2 is closed. That is, as indicated by the state St25 of FIG. 6, the second holding unit MEM2 is turned off (closed), and thus a state where charge may not be held in any of the first holding unit MEM1 and the second holding unit MEM2 is set. Accordingly, the total amount of charge held is transmitted to the floating diffusion FD.

In step S22, at the time t24 of FIG. 5, the floating gate FG is turned off (closed), and thus the transmission of the charge to the floating diffusion FD from the first holding unit MEM1 and the second holding unit MEM2 is terminated. At this time, since the selection unit SEL is set to be in an on state by the process of step S18, the amplification unit AMP amplifies a voltage supplied from the power source VDD in accordance with the amount of charge transmitted to the floating diffusion FD and then outputs a pixel signal.

In step S23, as indicated by time t62 of FIG. 5, the selection unit SEL is turned off, and thus the output from the amplification unit AMP is stopped.

As described above, charge transmitted from the photodiode PD is held in two of the first holding unit MEM1 and the second holding unit MEM2, and the charge is read out so that the second holding unit MEM2 is turned off after the first holding unit MEM1 is turned off. As a result, a distance at which the charge is transmitted is shortened by the electrode of the second holding unit MEM2 which is half the size of a space for holding the charge, thereby allowing a stronger electric field to be generated. Thus, the held charge is more reliably read out to the floating diffusion FD.

Second Embodiment

Configuration Example and Circuit Configuration Example of Solid-State Imaging Device according to Second Embodiment In the above, an example in which a holding unit is divided into two pieces as a whole has been described, but the holding unit may be divided into a greater number of pieces.

Figure 7:
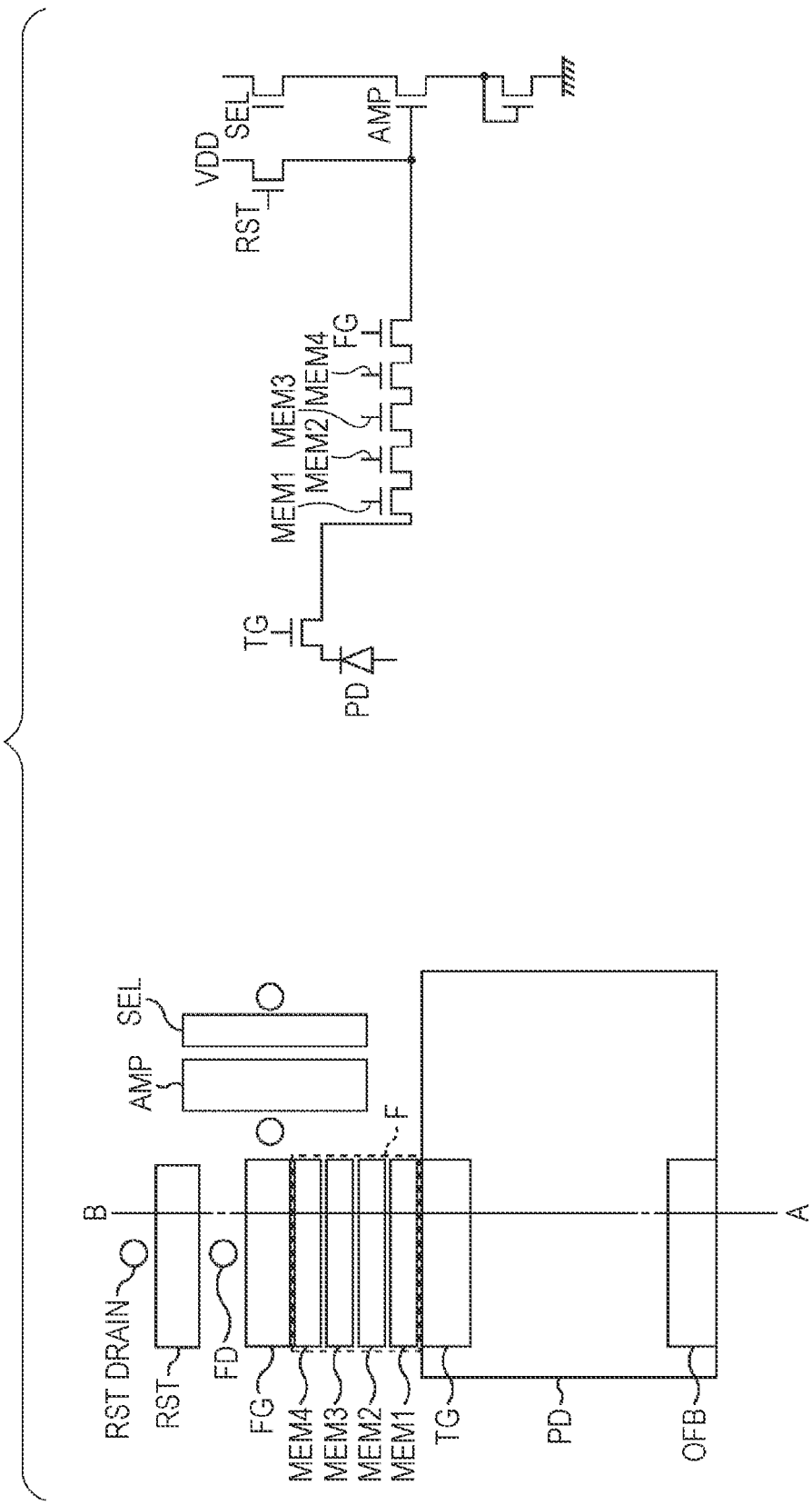
FIG. 7 is a diagram illustrating a configuration example of a solid-state imaging device according to a second embodiment to which the present disclosure is applied.

The left side of FIG. 7 shows a configuration example of a solid-state imaging device in which a holding unit is divided into four pieces, and the right side of FIG. 7 shows a circuit configuration example at that time. In the configuration example of the solid-state imaging device shown on the left side of FIG. 7 and the circuit configuration example of the solid-state imaging device shown on the right side of FIG. 7, components having the same functions as those of the configuration example of the solid-state imaging device of FIG. 2 and those of the circuit configuration example of FIG. 3 will be given the same reference numerals, signs and names, and the description thereof will be appropriately omitted.

That is, the configuration example and the circuit configuration example of the solid-state imaging device of FIG. 7 are different from the configuration example of the solid-state imaging device of FIG. 2 and the circuit configuration example of FIG. 3 in that a first holding unit MEM1 to a fourth holding unit MEM4 each having a holding unit divided into four pieces are provided instead of the first holding unit MEM1 and the second holding unit MEM2.

Figure 8:
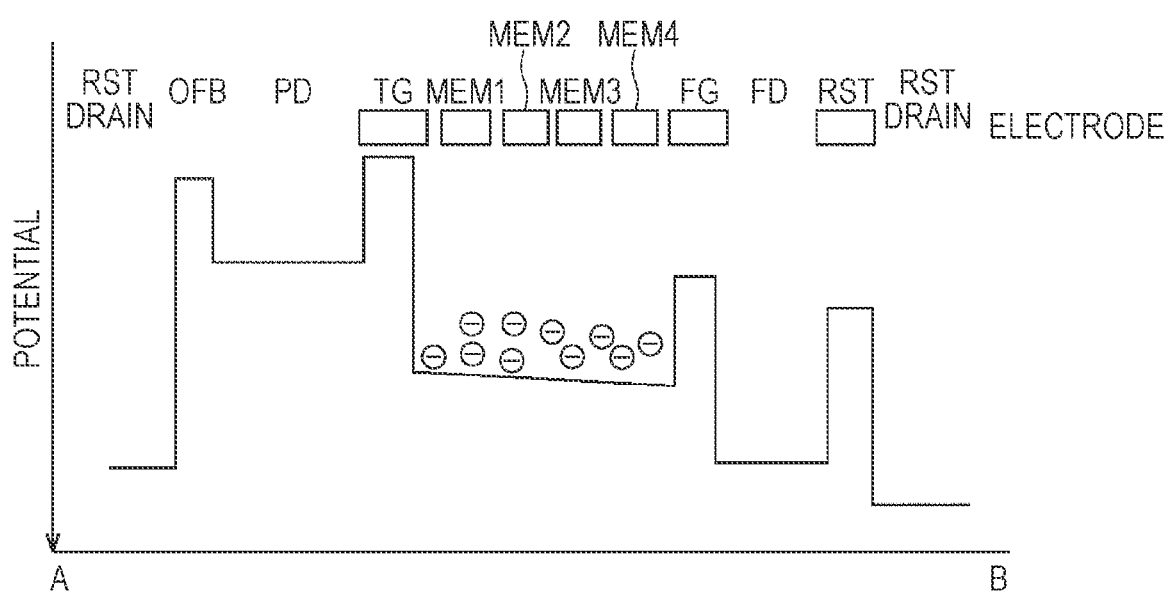
FIG. 8 is a diagram illustrating potential distribution of the solid-state imaging device of FIG. 7.

With such a configuration, as shown in FIG. 8, since each of the first holding unit MEM1 to the fourth holding unit MEM4 occupies a quarter of a transmission distance of charge which is held, it is possible to generate a stronger electric field in each electrode and to more reliably read out the held charge to a floating diffusion FD. In addition, FIG. 8 shows an example of potential distribution in a cross-section taken along line A-B in the solid-state imaging device of FIG. 7.

Charge Accumulation Transmission Process Using Solid-State Imaging Device of FIG. 7

Figure 9:
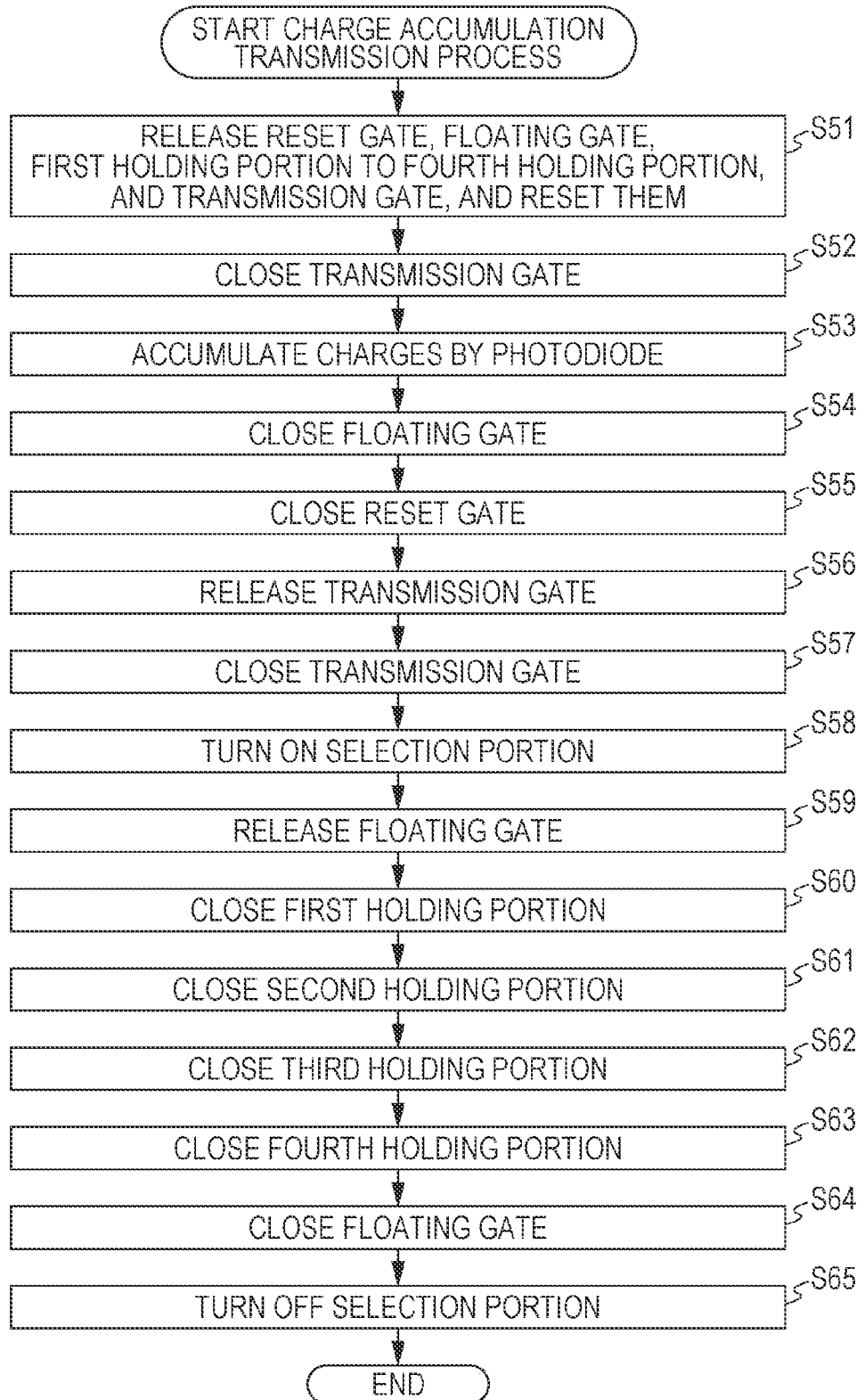
FIG. 9 is a flow chart illustrating a charge accumulation transmission process using the solid-state imaging device of FIG. 7.

Next, a charge accumulation transmission process of the solid-state imaging device of FIG. 7 will be described with reference to a flow chart of FIG. 9 and a timing chart of FIG. 10. In addition, FIG. 10 shows a control state at a timing of the turning-on (High) or turning-off (Low) of each of the reset gate RST, the floating gate FG, the fourth holding unit MEM4 to the first holding unit MEM1, the transmission gate TG, and the selection unit SEL from above.

In step S51, the reset gate RST, the floating gate FG, the fourth holding unit MEM4 to first holding unit MEM1, and transmission gate TG are sequentially controlled to be turned on in this order, and thus the accumulated charge is released.

Figure 10:
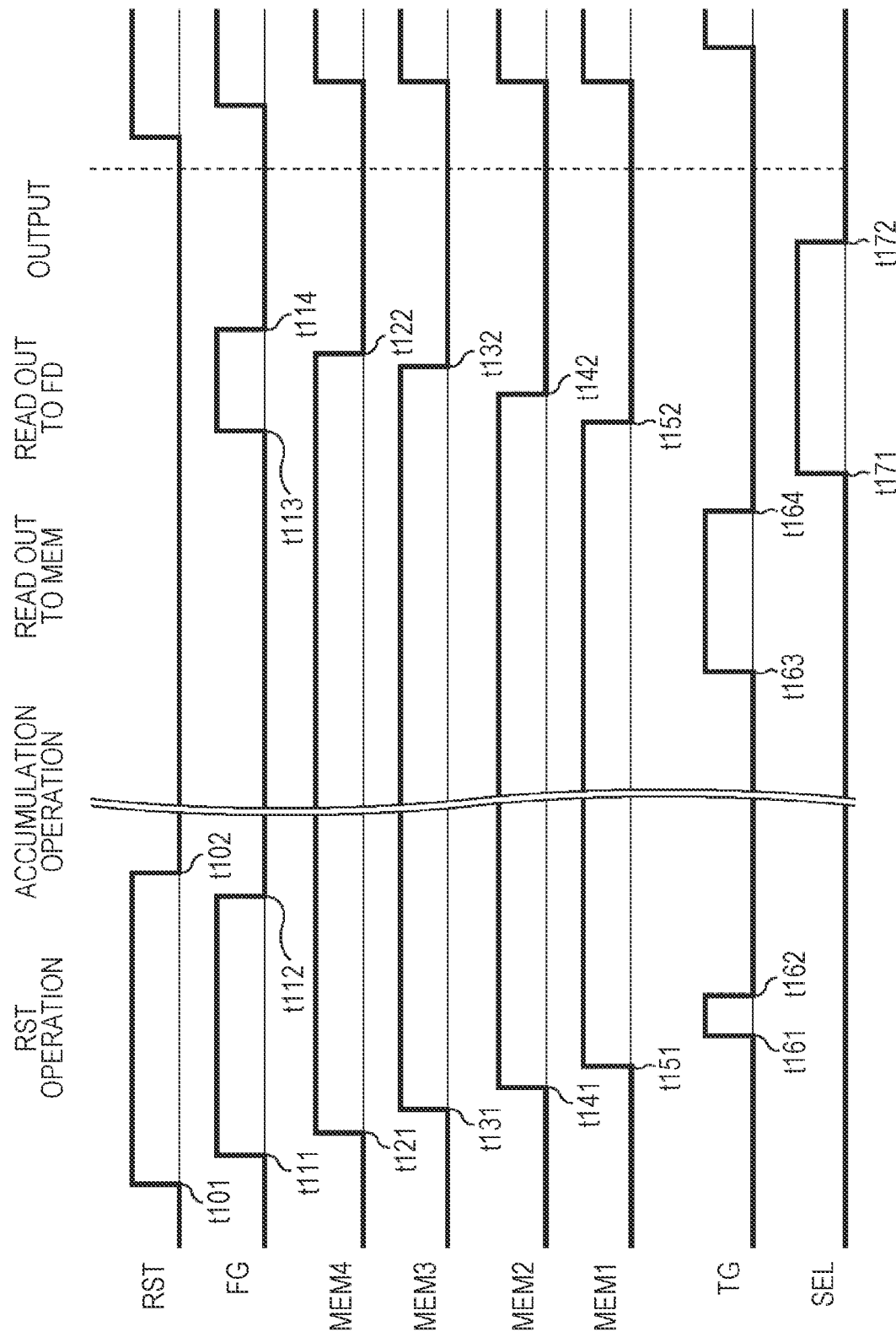
FIG. 10 is a timing chart illustrating the charge accumulation transmission process using the solid-state imaging device of FIG. 7.

That is, as shown in FIG. 10, at times t101, til1, t121, t131, t141, t151, and t161, the reset gate RST, the floating gate FG, the fourth holding unit MEM4 to the first holding unit MEM1, and the transmission gate TG are controlled to be turned on, and thus the accumulated charge is released, thereby executing a reset operation.

In step S52, as indicated by time t162 of FIG. 10, the transmission gate TG is turned off (closed).

In step S53, the turning off (closing) of the transmission gate TG starts an accumulation operation of accumulating the charge generated by the photodiode PD.

In step S54, as indicated by time t112 of FIG. 10, the floating gate FG is turned off (closed), and thus a state where the charge can be held in the first holding unit MEM1 to the second holding unit MEM4 is set.

In step S55, at time t102 of FIG. 10, the reset gate RST is turned off (closed), and thus a state where the charge can be accumulated in the floating diffusion FD is set.

In step S56, as indicated by time t163 of FIG. 10, the transmission gate TG is controlled to be turned on, and thus the transmission gate TG is released (opened). As a result, the charge accumulated in the photodiode PD is transmitted to the first holding unit MEM1 to the fourth holding unit MEM4.

In step S57, as indicated by time t164 of FIG. 10, the transmission gate TG is controlled to be turned off, and thus the transmission gate TG is closed. As a result, the charge accumulated in the photodiode PD is read out to the first holding unit MEM1 to the fourth holding unit MEM4, and the charge is held in the first holding unit MEM1 to the fourth holding unit MEM4. In addition, the state at this time is the state shown in FIG. 8.

In step S58, as indicated by time t171 of FIG. 10, the selection unit SEL is turned on, and thus a state is set in which a voltage corresponding to the charge accumulated in the floating diffusion FD is output as a pixel signal from the amplification unit AMP. However, in this stage, since charge is not accumulated in the floating diffusion FD, there is no pixel signal output from the amplification unit AMP.

In step S59, as indicated by time t113 of FIG. 10, the floating gate FG is turned on (opened), and thus the charge held in the first holding unit MEM1 to the fourth holding unit MEM4 is read out to the floating diffusion FD.

In step S60, at time t152 of FIG. 10, the first holding unit MEM1 is turned off, and thus the first holding unit MEM1 is closed. That is, the first holding unit MEM1 is turned off (closed), and thus the electric field in the electrode of each of the second holding unit MEM2 to the fourth holding unit MEM4 is strengthened. Accordingly, the inclination of the potential becomes sharp, which leads to a state where the held charge has a tendency to be transmitted to the floating diffusion FD.

In steps S61 and S62, as indicated by times t142 and t132 of FIG. 10, the second holding unit MEM2 and the third holding unit MEM3 are turned off in stages, and the second holding unit MEM2 is closed, and then the third holding unit MEM3 is closed. That is, the second holding unit MEM2 and the third holding unit MEM3 are sequentially turned off (closed), and thus the electric fields in the electrodes of the third holding unit MEM3 and the fourth holding unit MEM4 are strengthened in stages. Accordingly, the inclination of the potential becomes sharp, which leads to a state where the held charge has a tendency to be transmitted to the floating diffusion FD.

In step S63, at time t122 of FIG. 10, the fourth holding unit MEM4 is turned off, and thus the fourth holding unit MEM4 is closed. That is, the fourth holding unit MEM4 is turned off (closed), and thus a state where charge may not be held in any of the first holding unit MEM1 to the fourth holding unit MEM4 is set. Accordingly, the total amount of charge held is transmitted to the floating diffusion FD.

In step S64, at time t114 of FIG. 10, the floating gate FG is turned off (closed), and thus the transmission of the charge to the floating diffusion FD from the first holding unit MEM1 to the fourth holding unit MEM4 is terminated. At this time, since the selection unit SEL is set to be in an on state by the process of step S58, the amplification unit AMP amplifies a voltage supplied from the power source VDD in accordance with the amount of charge transmitted to the floating diffusion FD and then outputs the voltage as a pixel signal.

In step S65, as indicated by time t172 of FIG. 10, the selection unit SEL is turned off, and thus the output from the amplification unit AMP is stopped.

As described above, charge transmitted from the photodiode PD is held in four of the first holding unit MEM1 to the fourth holding unit MEM4, and the charge is read out so that the holding units up to the fourth holding unit MEM4 are sequentially turned off in stages after the first holding unit MEM1 is turned off. As a result, a distance at which the charge is transmitted is shortened to a quarter by an electrode of a quarter of a space for holding the charge, thereby allowing a stronger electric field to be generated. Thus, the held charge is more reliably read out to the floating diffusion FD.

In the above, an example in which an electrode constituting a holding unit is divided into four pieces has been described, but the electrode may be divided into a number other than four.

Third Embodiment

Configuration Example and Circuit Configuration Example of Solid-State Imaging Device according to Third Embodiment In the above, a description has been made of an example in which a holding unit is divided into four pieces to reduce a transmission distance of charge in an electrode constituting the holding unit to a quarter and an electric field is applied in stages to form a stronger electric field in a transmission direction of the charge, thereby allowing the held charge to be more reliably transmitted.

Incidentally, in the above, a description has been made of a configuration example in which divided electrodes are disposed so that the transmission gate TG is present on a straight line which is a division direction, but a configuration may be adopted in which the transmission gate TG is disposed in a direction perpendicular to the division direction.

Figure 11:
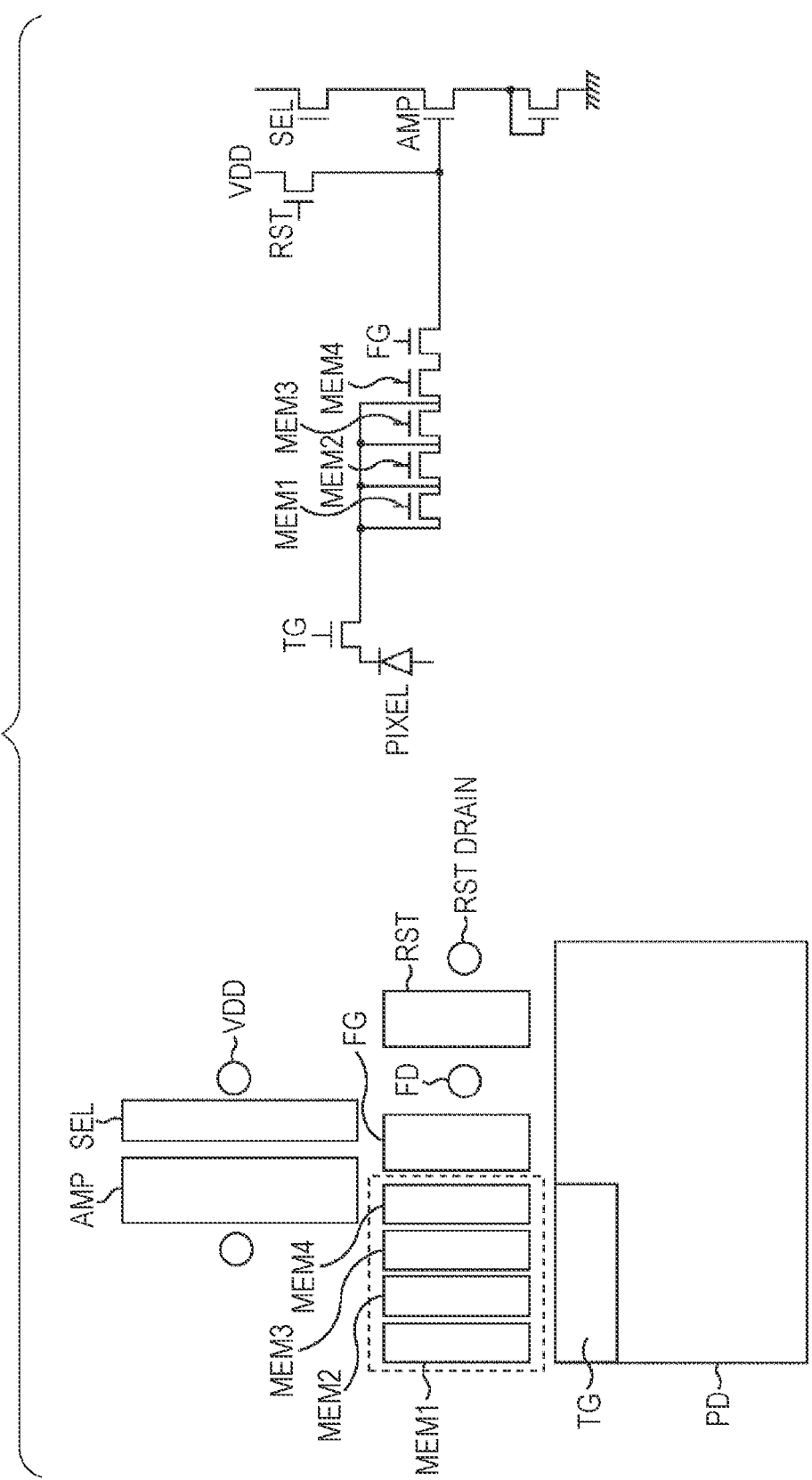
FIG. 11 is a diagram illustrating a configuration example of a solid-state imaging device according to a third embodiment to which the present disclosure is applied.

That is, the left side of FIG. 11 shows a configuration example of a solid-state imaging device in which divided electrodes are disposed so that a transmission gate TG is disposed in a direction perpendicular to a division direction. In addition, the right side of FIG. 11 shows a circuit configuration example of the solid-state imaging device shown on the left side of FIG. 11. In the solid-state imaging device of FIG. 11, components having the same functions as those of the solid-state imaging device of FIG. 7 will be given the same reference numerals, signs and names, and the description thereof will be appropriately omitted.

That is, the solid-state imaging device of FIG. 11 is different from the solid-state imaging device of FIG. 7 in that the transmission gate TG of a photodiode PD is provided in a direction perpendicular to a direction in which a first holding unit MEM1 to a fourth holding unit MEM4 are divided in a layout thereof. With such a configuration, as shown on the right side of FIG. 11, in the circuit configuration example, sources and drains of the first holding unit MEM1 to the third holding unit MEM3 are connected to each other in parallel.

With such a configuration, it is possible to ensure a wide transmission path, which makes it easier for charge to be transmitted.

Figure 12:
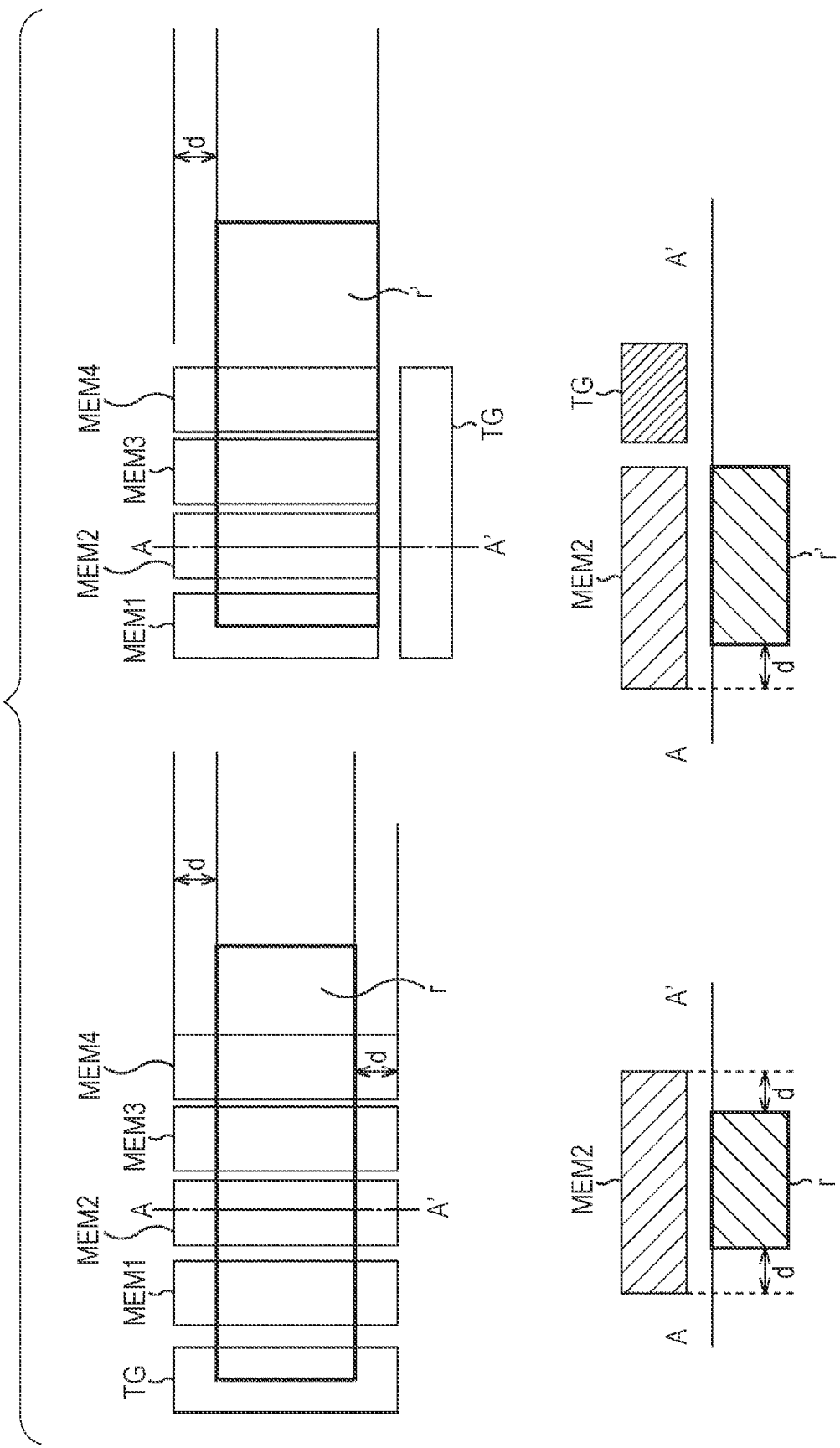
FIG. 12 is a diagram illustrating a difference between transmission paths of charge according to layouts of a first holding unit to a fourth holding unit.

That is, as shown on the upper left side of FIG. 12, a transmission path r in the first holding unit MEM1 to the fourth holding unit MEM4 of the solid-state imaging device of FIG. 7 is formed in a state where a margin having a distance d is generated in a direction perpendicular to a transmission direction. In FIG. 12, the upper left side shows layouts of the transmission gate TG and the first holding unit MEM1 to the fourth holding unit MEM4 of the solid-state imaging device of FIG. 7, and the upper right side shows layouts of the transmission gate TG and the first holding unit MEM1 to the fourth holding unit MEM4 of the solid-state imaging device of FIG. 11. In addition, the lower left side of FIG. 12 shows a relationship between the second holding unit MEM2 in a cross-section taken along line A-A' on the upper left side of FIG. 12 and a cross-section of the transmission path r through which charge is transmitted, and the lower right side of FIG. 12 shows a relationship between the second holding unit MEM2 in a cross-section taken along line A-A' of the upper right side of FIG. 12 and a cross-section of a transmission path r' through which charge is transmitted.

That is, as shown on the lower left side of FIG. 12, the transmission path r desires a margin having a distance d in a direction horizontal to the transmission direction. On the other hand, as shown on the upper right side of FIG. 12, when the transmission gate TG is disposed in a direction perpendicular to a direction in which the first holding unit MEM1 to the fourth holding unit MEM4 are divided, one end of the second holding unit MEM2 comes into contact with the transmission gate TG as shown on the lower right side of FIG. 12. Thus, it is possible to include an end having one distance d as a portion of the transmission path. Accordingly, the transmission path r' is configured to be thicker than the transmission path r by one distance d.

As a result, the transmission path r' configured to be wide and thick makes it easier for charge to be transmitted, and thus it is possible to more reliably transmit held charge to a floating diffusion FD.

Fourth Embodiment

Circuit Configuration Example of Solid State Imaging Device according to Fourth Embodiment In the above, a description has been made of an example in which each solid-state imaging device outputs a pixel signal of one pixel. However, for example, the amount of charge output from photodiodes of pixels may be set to the amount of charge capable of being held in a portion of divided holding units, and charge from the plurality of photodiodes may be added (summed) and then output.

Figure 13:
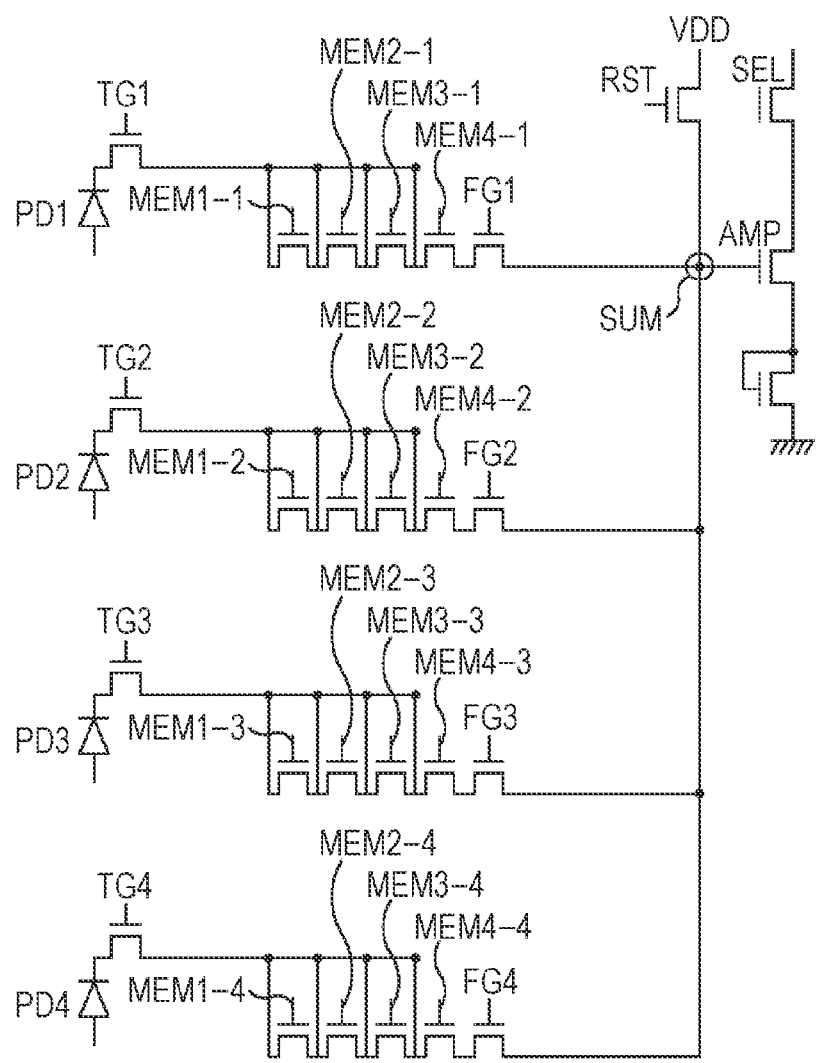
FIG. 13 is a diagram illustrating a circuit configuration example of a solid-state imaging device according to a fourth embodiment to which the present disclosure is applied.

FIG. 13 shows a circuit configuration example of a solid-state imaging device in which charge supplied from photodiodes of four pixels is added and then output. In the circuit configuration example of FIG. 13, components having the same functions as those of the circuit configuration of FIG. 7 will be given the same reference numerals, signs and names, and the description thereof will be appropriately omitted.

That is, the circuit configuration example of FIG. 13 is different from the circuit configuration example of FIG. 7 in that charge accumulated in photodiodes PD of solid-state imaging devices of four pixels is added and is then output by an amplification unit AMP. In FIG. 13, a configuration is adopted in which the configurations of the solid-state imaging devices of four pixels are combined, and thus components having the same function will be discriminated by assigning signs of 1 to 4 to the ends thereof. However, when it is not necessary to specially perform discrimination, the ends will not be given numbers.

In more detail, provided are transmission gates TG1 to TG4, first holding units MEM1-1 to MEM1-4, second holding units MEM2-1 to MEM2-4, third holding units MEM3-1 to MEM3-4, fourth holding units MEM4-1 to MEM4-4, and floating gates FG1 to FG4 which correspond to respective photodiodes PD1 to PD4 of four pixels. Further, output sides of the floating gates FG1 to FG4 are connected to a reset gate RST and an amplification unit AMP in a state where all outputs are added by an addition unit SUM. The "addition unit SUM" used herein is substantially a floating diffusion FD which is shared by four pixels. Charge is read out to the floating diffusion FD, which is shared, from the floating gates FG1 to FG4 and is then added.

In addition, although not shown in the drawing, the solid-state imaging device is configured such that the reset gate RST, the amplification unit AMP, the selection unit SEL, and the addition unit SUM (floating diffusion FD) of FIG. 7 are shared by the transmission gates TG1 to TG4, the first holding units MEM1-1 to MEM1-4, the second holding units MEM2-1 to MEM2-4, the third holding units MEM3-1 to MEM3-4, the fourth holding units MEM4-1 to MEM4-4, and the floating gates FG1 to FG4 of four pixels.

With such a configuration, a timing when each of the floating gates FG1 to FG4 is turned on or turned off is controlled, and thus it is possible to add charge of four pixels using the addition unit SUM and then output the charge to the amplification unit AMP or to output the charge individually. In this example, although four pixels are added, other numbers of pixels may be added.

Thinning Read-Out.

As described above, it is possible to reduce the degradation of a pixel signal and to realize thinning read-out at a high speed by using a configuration in which charge of a plurality of pixels can be added and then output.

Figure 14:
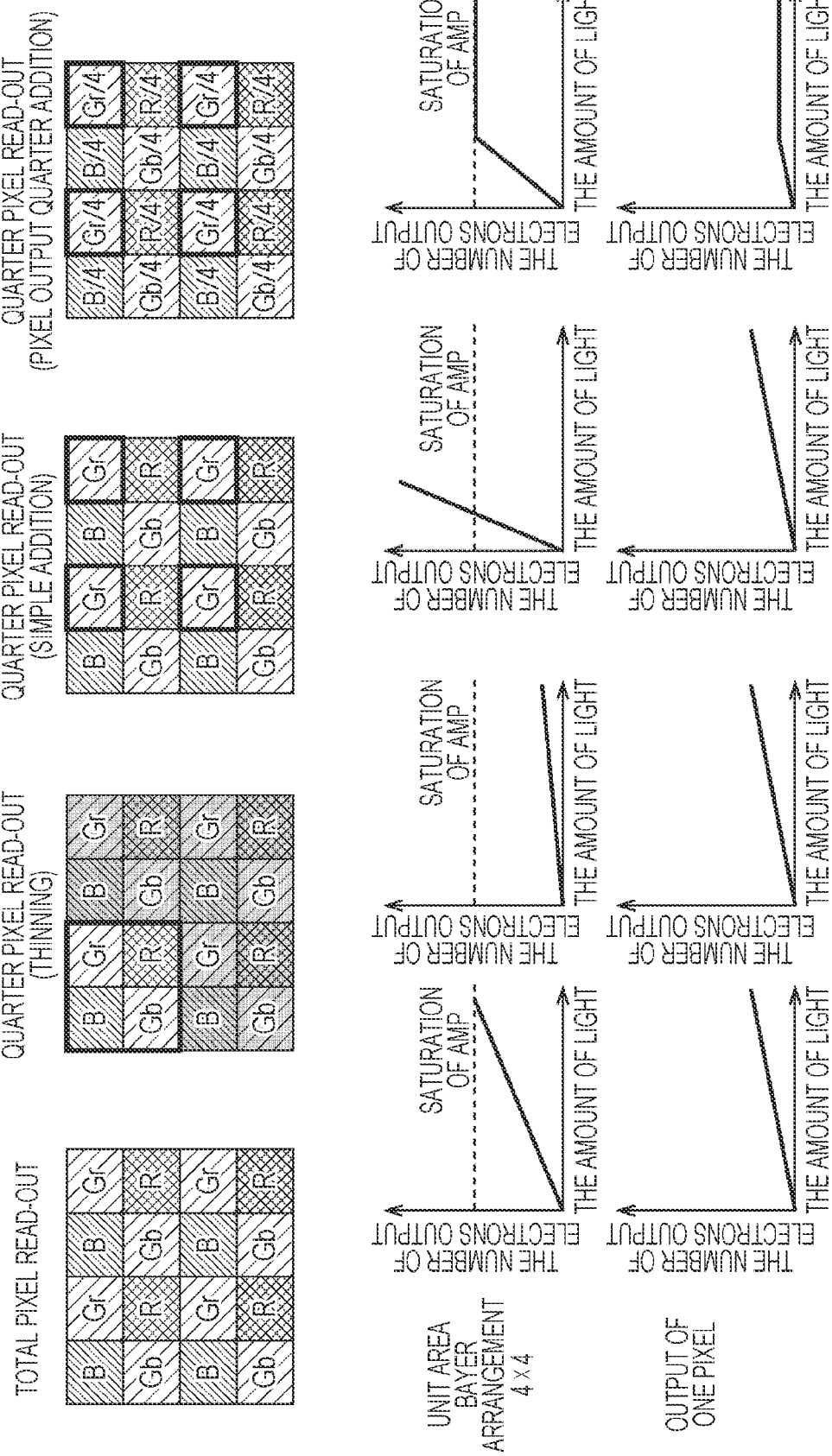
FIG. 14 is a diagram illustrating a read-out pattern of a pixel signal in the solid-state imaging device of FIG. 13.

In the thinning read-out, for example, a so-called thinning process of simply reading out a pixel signal from only a quarter of all pixels, a simple addition process of reading out and simply adding a quarter of all pixels, a pixel output quarter addition process of reading out only a quarter (evenly reading out a quarter) of each charge of a quarter of all pixels, and the like are considered. FIG. 14 is a diagram showing comparisons between a total pixel read-out process of individually performing read-out on each pixel, the thinning process, the simple addition process, and the pixel output quarter addition process.

In FIG. 14, it is assumed that four pixels of which the charge is added are arranged in a Bayer array which is constituted by sixteen pixels of 4 pixels×4 pixels, for example, as shown by the respective pixels on the upper stage. In FIG. 14, squares indicated by "R", "B", "Gr", and "Gb" show a red pixel, a blue pixel, a green pixel on a line in which a red pixel is disposed, and a green pixel on a line in which a blue pixel is disposed. Further, FIG. 14 shows cases of a total pixel read-out process, a thinning process, a simple addition process, and a pixel output quarter addition process from the left, and shows patterns of pixels that are read out, a relationship between the amount of light per unit area and the number of output electrons, and a relationship between the amount of light per one pixel and the number of output electrons from above.

For example, as shown at a second position from the left of FIG. 14, when only four of sixteen pixels are read out by a thinning process, the number of output electrons with respect to the amount of light per one pixel is the same as that in the total pixel read-out process as shown on the lower stage of the second position from the left of FIG. 14. However, as shown on the middle stage of the second position from the left of FIG. 14, the number of output electrons with respect to the amount of light per unit area is reduced. This is because a light-receiving area becomes smaller due to the thinning. In this case, it is easy to be influenced by low illuminance noise.

In addition, for example, as shown on the uppermost stage of a second position from the right of FIG. 14, in a case of the simple addition process of simply adding charge of a pixel of each color and then reading out the charge like the green pixel Gr enclosed by a heavy line, output per one pixel is similar to that in a case where read-out is performed individually as shown on the lower stage of the second position from the right of FIG. 14. However, as shown on the middle stage of the second position from the right of FIG. 14, comparing the number of output electrons with respect to the amount of light per unit area with that in the case where read-out is performed individually, charge of one pixel may be simply quadrupled and then output, and thus may reach the amount of saturation of the amplification unit AMP, or a state where charge may not be accumulated in the floating diffusion FD is set. As a result, there is a concern that an appropriate signal may not be output.

Consequently, in the solid-state imaging device of FIG. 13, as shown on the uppermost stage of the rightmost side of FIG. 14, for example, only charge held in any one of a first holding unit MEM1 to a fourth holding unit MEM4 of the green pixel Gr is extracted so that charge per one pixel is evened off to a quarter and the charge evened off to a quarter is added by four pixels. With such a process, the number of output electrons with respect to the amount of light per one pixel is a quarter of that in a case where read-out is performed individually. However, since the number of output electrons with respect to the amount of light per unit area are added in the state of a quarter even when each pixel has a maximum value, the added charge is only set to have a maximum value for one pixel. For this reason, since charge of four pixels is simultaneously read out, it is possible to increase a read-out speed. In addition, since the light-receiving area itself is not reduced, it is possible to reduce the influence of low illuminance noise.

Individual Charge Accumulation Transmission Process for Each Pixel Using Solid-State Imaging Device of FIG. 13

Next, an individual charge accumulation transmission process for each pixel using the solid-state imaging device of FIG. 13 will be described. In addition, a charge accumulation transmission process of the total pixel read-out process is essentially performed by repeating the process described above with reference to the flow chart of FIG. 9 in pixel units. However, in a case of the solid-state imaging device of FIG. 13, the floating gates FG1 to FG4 are individually turned on at different timings, and thus charge is transmitted to the floating diffusion FD for each pixel, and then a pixel signal is output from the amplification unit AMP.

Figure 15:
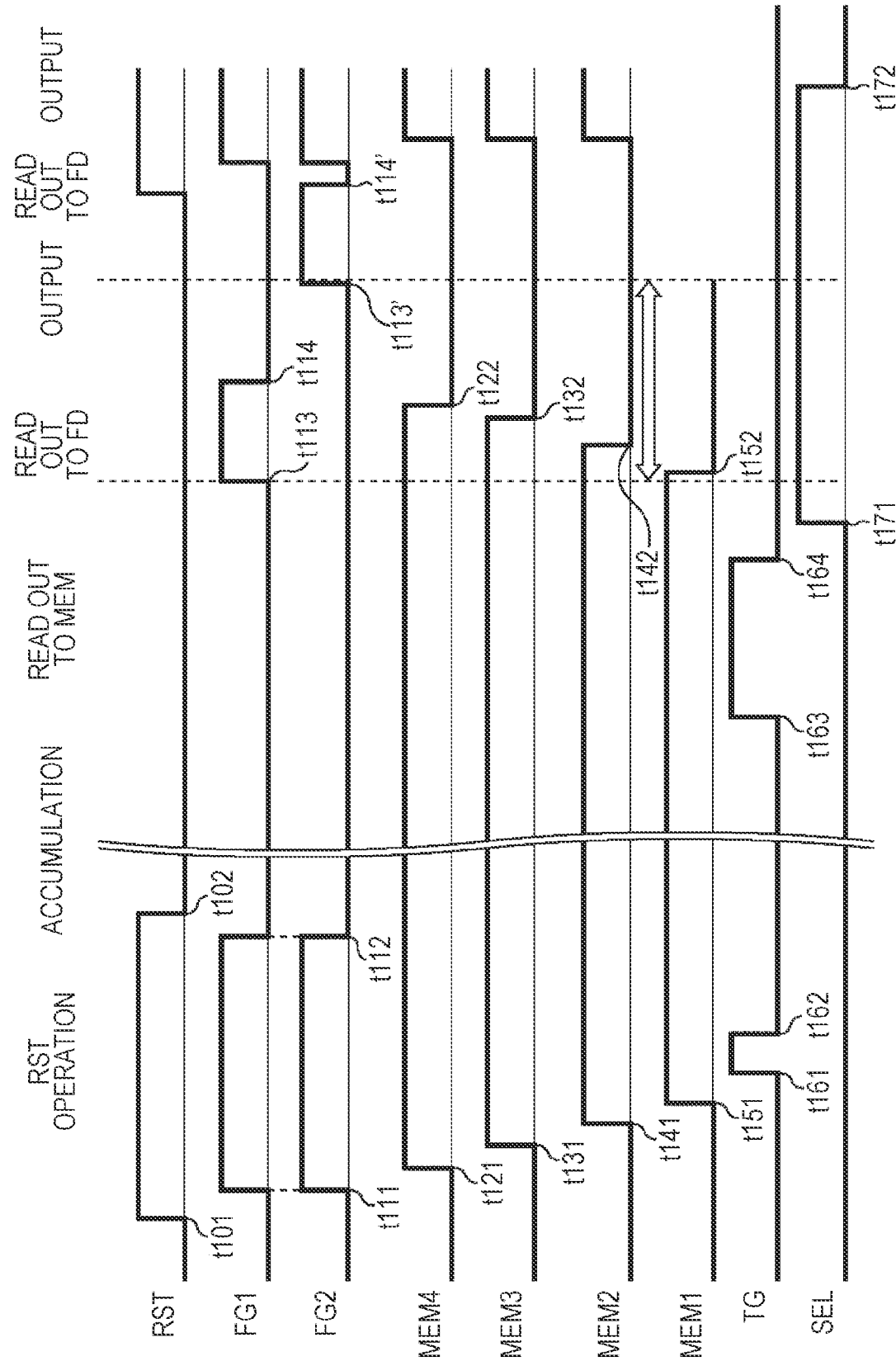
FIG. 15 is a timing chart illustrating a charge accumulation transmission process in a case where a pixel signal is individually output for each pixel using the solid-state imaging device of FIG. 13.

That is, the processes of times t113 to t113' of FIG. 15 are individually repeated at different timings, with respect to four pixels. That is, in a timing chart of FIG. 15, a waveform of the floating gate FG in the timing chart of FIG. 10 is shown as a waveform of the floating gate FG1, and a waveform of the floating gate FG2 is shown thereunder. Further, waveforms of the fourth holding unit MEM4 to the first holding unit MEM1 and the transmission gate TG are shown as waveforms of the fourth holding unit MEM4-1 to the first holding unit MEM1-1 and the transmission gate TG1.

That is, the fourth holding unit MEM4-1 to the first holding unit MEM1-1 corresponding to the photodiode PD1 are sequentially turned off in the order of time t152, time t142, time t132, and time t122 after the floating gate FG1 is turned on at the time t113, and thus held charge is transmitted to the floating diffusion FD. The floating gate FG1 is turned off at time t114, and thus the transmission of charge of the photodiode PD1 is completed, and an output as a pixel signal is obtained.

Thereafter, at the time t113', the floating gate FG2 corresponding to the photodiode PD2 is turned on, and thus the fourth holding unit MEM4-2 to the first holding unit MEM1-2 corresponding to the photodiode PD1 are turned off at intervals similar to those of the fourth holding unit MEM4-1 to the first holding unit MEM1-1 corresponding to a pixel P1. At time t114', the floating gate FG2 is turned off, and thus the transmission of charge of the photodiode PD2 is completed, and an output as a pixel signal is obtained.

Although not shown in the drawing, a similar process is repeated with respect to the floating gates FG3 and FG4, and thus pixel signals of pixels P3 and P4 are sequentially output.

With this process, it is possible to read out a pixel signal, for example, using the above-described total pixel read-out process as shown on the leftmost side of FIG. 14.

Charge accumulation transmission process through Addition for Every Four Pixels Using Solid-State Imaging Device of FIG. 13

Figure 16:
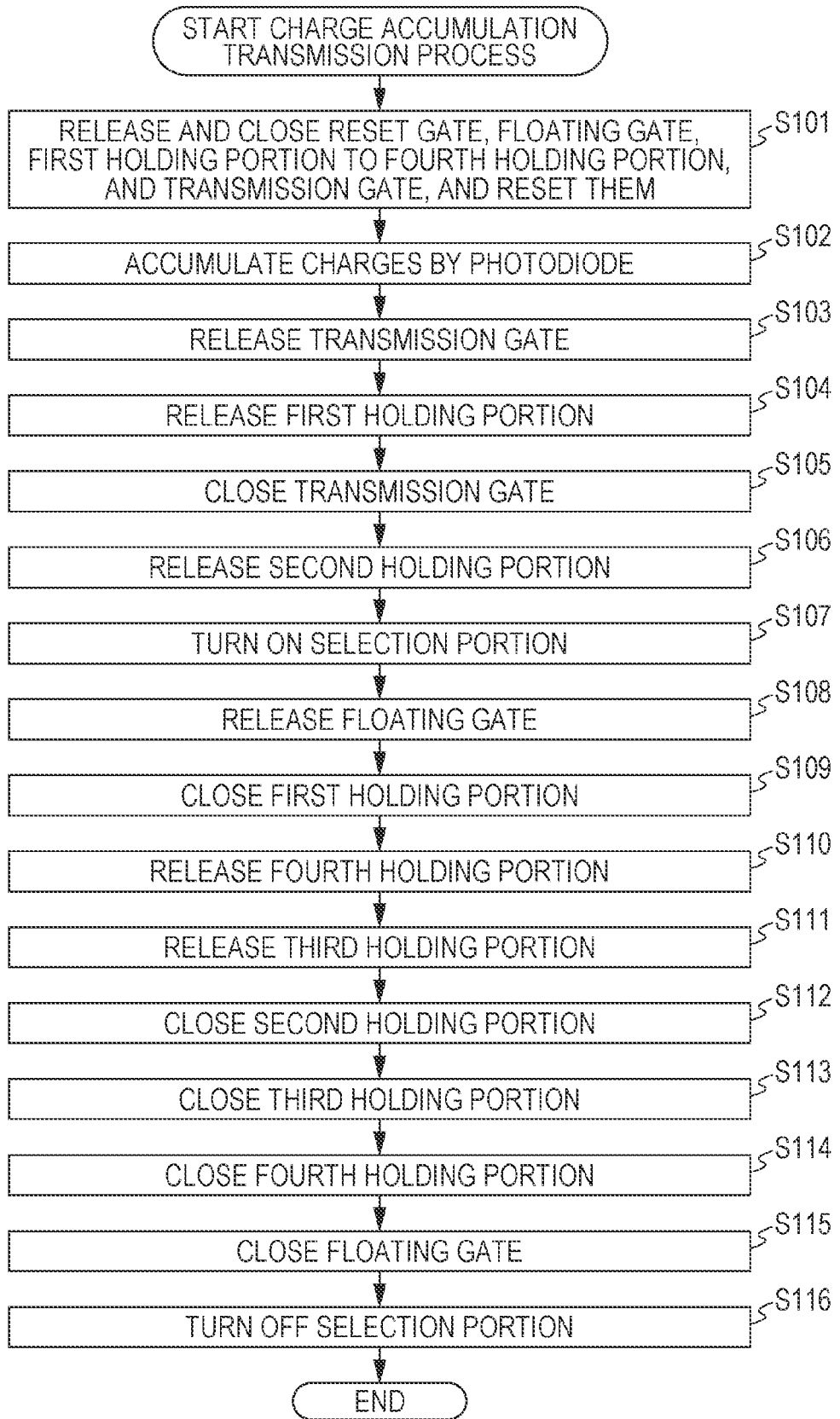
FIG. 16 is a flow chart illustrating a charge accumulation transmission process in a case where a pixel signal is output by addition for every four pixels, using the solid-state imaging device of FIG. 13.
Figure 17:
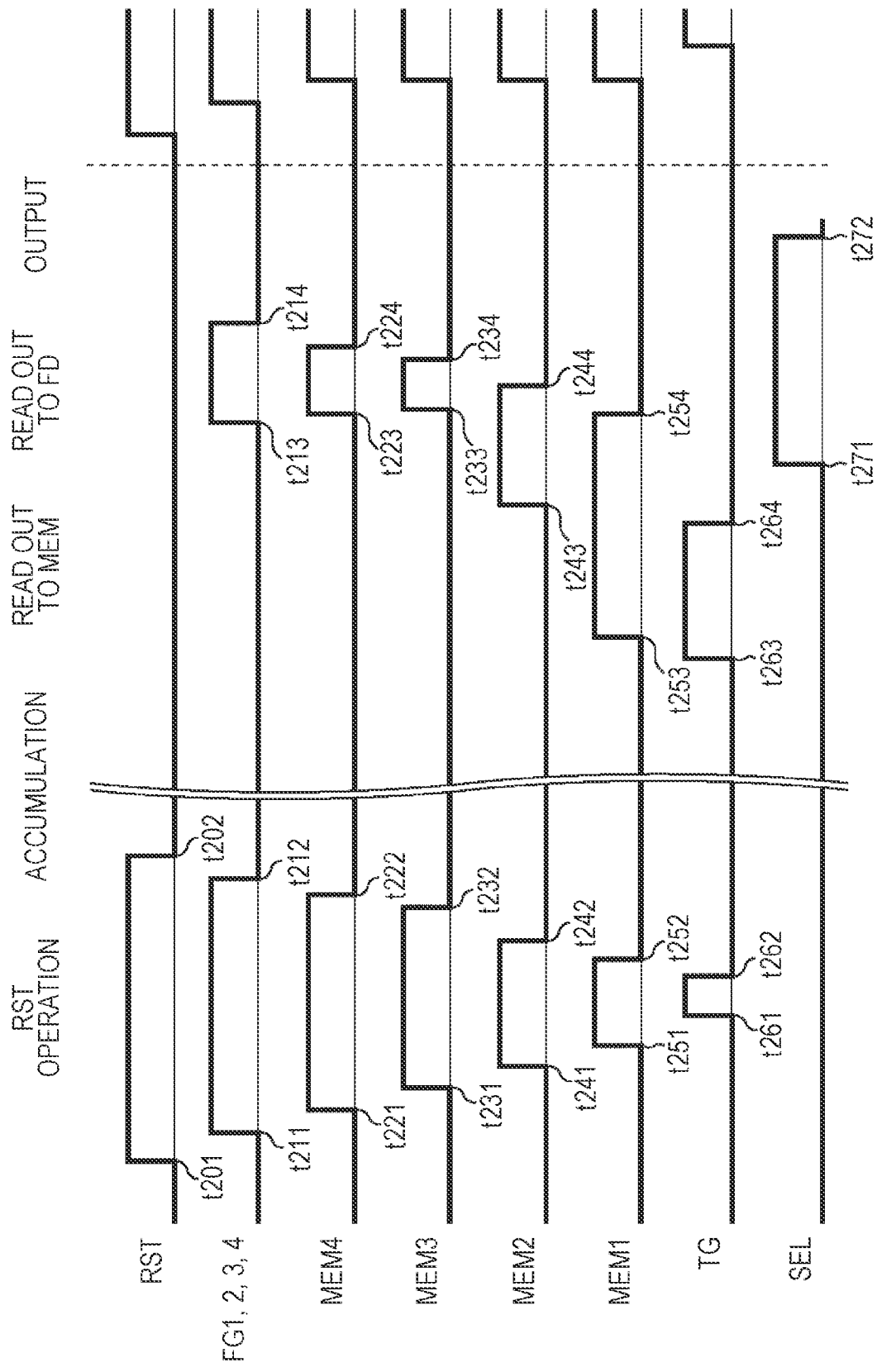
FIG. 17 is a timing chart illustrating the charge accumulation transmission process in a case where a pixel signal is output by addition for every four pixels, using the solid-state imaging device of FIG. 13.

Next, a charge accumulation transmission process through addition for every four pixels using the solid-state imaging device of FIG. 13 will be described with reference to the flow chart of FIG. 16 and the timing chart of FIG. 17. In this example, regarding each of four pixels, charge supplied through the transmission gate TG is held in only the first holding unit MEM1 among the first holding unit MEM1 to the fourth holding unit MEM4 of each of the photodiodes PD1 to PD4, and the held charge is transmitted to the floating diffusion FD by the turning-on or turning-off of the floating gate FG. FIG. 17 shows a control state at a timing of the turning-on (High) or turning-off (Low) of each of the reset gate RST, the floating gates FG1 to FG4, the fourth holding unit MEM4 to the first holding unit MEM1 (each of which corresponds to four pixels), the transmission gates TG1 to TG4, and the selection unit SEL from above. Therefore, all of these are processes that are simultaneously performed in four pixels, except for the control states of the reset gate RST and the selection unit SEL.

That is, in step S51, the reset gate RST, the floating gate FG, the fourth holding unit MEM4 to the first holding unit MEM1, and the transmission gate TG are sequentially controlled to be turned on in this order, and are then turned off in the reverse order after the accumulated charge is released, and thus a reset operation is executed.

That is, as shown in FIG. 17, at times t201, t211, t221, t231, t241, t251, and t261, the reset gate RST, the floating gates FG1 to FG4, the fourth holding unit MEM4 to the first holding unit MEM1, and the transmission gates TG1 to TG4 are controlled to be turned on, and thus the accumulated charge is released. Further, thereafter, at times t262, t252, t242, t232, t222, t212, and t202, an operation of resetting the transmission gates TG1 to TG4, the fourth holding unit MEM4 to the first holding unit MEM1, the reset gate RST, and the floating gates FG1 to FG4 is executed in the reverse order to the above-described order. Thus, the reset gate RST is turned off, and thus a state where the charge can be accumulated in the floating diffusion FD is set.

In step S102, an operation of accumulating charge generated by the photodiodes PD of the pixels P1 to P4 is started.

In step S103, as indicated by time t263 of FIG. 17, the transmission gate TG is controlled to be turned on, and thus the transmission gate TG is released (opened). As a result, a state where the charge accumulated in the photodiode PD can be transmitted to the first holding unit MEM1 is set.

In step S104, as indicated by time t253 of FIG. 17, the first holding unit MEM1 is turned on (opened). Thus, the first holding unit MEM1 is set to a state where the charge accumulated in the photodiode PD can be held therein. That is, since the transmission gate TG is released (opened) by the previous process, the charge accumulated in the photodiode PD is transmitted and is then held in the first holding unit MEM1.

In step S105, as indicated by time t264 of FIG. 17, the transmission gate TG is controlled to be turned off (closed). As a result of this process, the transmission of the charge accumulated in the photodiode PD to the first holding unit MEM1 is terminated.

In step S106, as indicated by time t243 of FIG. 17, the second holding unit MEM2 is controlled to be turned on (opened). As a result of this process, the charge held in the first holding unit MEM1 is transmitted to the second holding unit.

In step S107, as indicated by time t271 of FIG. 17, the selection unit SEL is turned on, and thus a state is set in which a voltage corresponding to the charge accumulated in the floating diffusion FD is output from the amplification unit AMP. However, in this stage, since charge is not accumulated in the floating diffusion FD, there is no pixel signal to be output from the amplification unit AMP.

In step S108, as indicated by time t213 of FIG. 17, the floating gates FG1 to FG4 are turned on (opened), and thus the charge held in the fourth holding unit MEM4 is read out to the floating diffusion FD.

In step S109, as indicated by time t254 of FIG. 17, the first holding unit MEM1 is turned off, and thus the first holding unit MEM1 is closed. That is, the first holding unit MEM1 is turned off (closed), and thus a state where the charge held in the first holding unit MEM1 is transmitted to the second holding unit MEM2 is set.

In step S110, as indicated by time t223 of FIG. 17, the fourth holding unit MEM4 is turned on (opened), and thus a state where the charge accumulated in the third holding unit MEM3 can be received and then held is set.

In step S111, as indicated by time t233 of FIG. 17, the third holding unit MEM3 is turned on (opened), and thus the charge held in the second holding unit MEM2 is transmitted to the floating diffusion FD through the third holding unit MEM3 and the fourth holding unit MEM4. At this time, since the selection unit SEL is set to be in an on state by the process of step S107, the amplification unit AMP amplifies a voltage supplied from the power source VDD in accordance with the amount of charge transmitted to the floating diffusion FD and then outputs a pixel signal. At this time, the addition unit SUM, which is substantially constituted by the floating diffusion FD, adds charge supplied from all the solid-state imaging devices of the pixels P1 to P4 and then supplies the charge to the amplification unit AMP.

In step S112, as indicated by time t244 of FIG. 17, the second holding unit MEM2 is turned off (closed), and thus an electric field according to the third holding unit MEM3 and the fourth holding unit MEM4 is strengthened. Accordingly, the held charge has a tendency to be transmitted to the floating diffusion FD.

In step S113, as indicated by time t234 of FIG. 17, the third holding unit MEM3 is turned off (closed), and thus electric field intensity in the fourth holding unit MEM4 is further strengthened. Accordingly, the held charge has a tendency to be transmitted to the floating diffusion FD.

In step S114, as indicated by time t224 of FIG. 17, the fourth holding unit MEM4 is turned off (closed).

In step S115, as indicated by time t214 of FIG. 17, the floating gates FG1 to FG4 are controlled to be turned off (closed). As a result, the transmission of the charge to the floating diffusion FD from the fourth holding unit MEM4 is terminated.

In step S116, as indicated by time t272 of FIG. 17, the selection unit SEL is turned off, and thus the output from the amplification unit AMP is stopped.

As described above, charge transmitted from the photodiode PD is held by the amount of charge capable of being held in the first holding unit MEM1, and is sequentially transmitted to the second holding unit MEM2 to the fourth holding unit MEM4, and is then read out to the floating diffusion FD. As a result, it is possible to transmit the charge to the floating diffusion FD by an amount which is evened off to a quarter of the amount of charge capable of being held in the first holding unit MEM1 to the fourth holding unit MEM4, in units of a pixel.

In addition, the addition unit SUM constituted by the floating diffusion FD adds charge of the solid-state imaging devices of four pixels and then supplies the charge to the amplification unit AMP. As a result, as described above with reference to FIG. 14, it is possible to simultaneously read out pixel signals of four pixels at a high speed without reducing the light-receiving area.

In the above, an example in which an electrode constituting a holding unit is divided into four pieces has been described, but the electrode may be divided into a number other than four.

Figure 18:
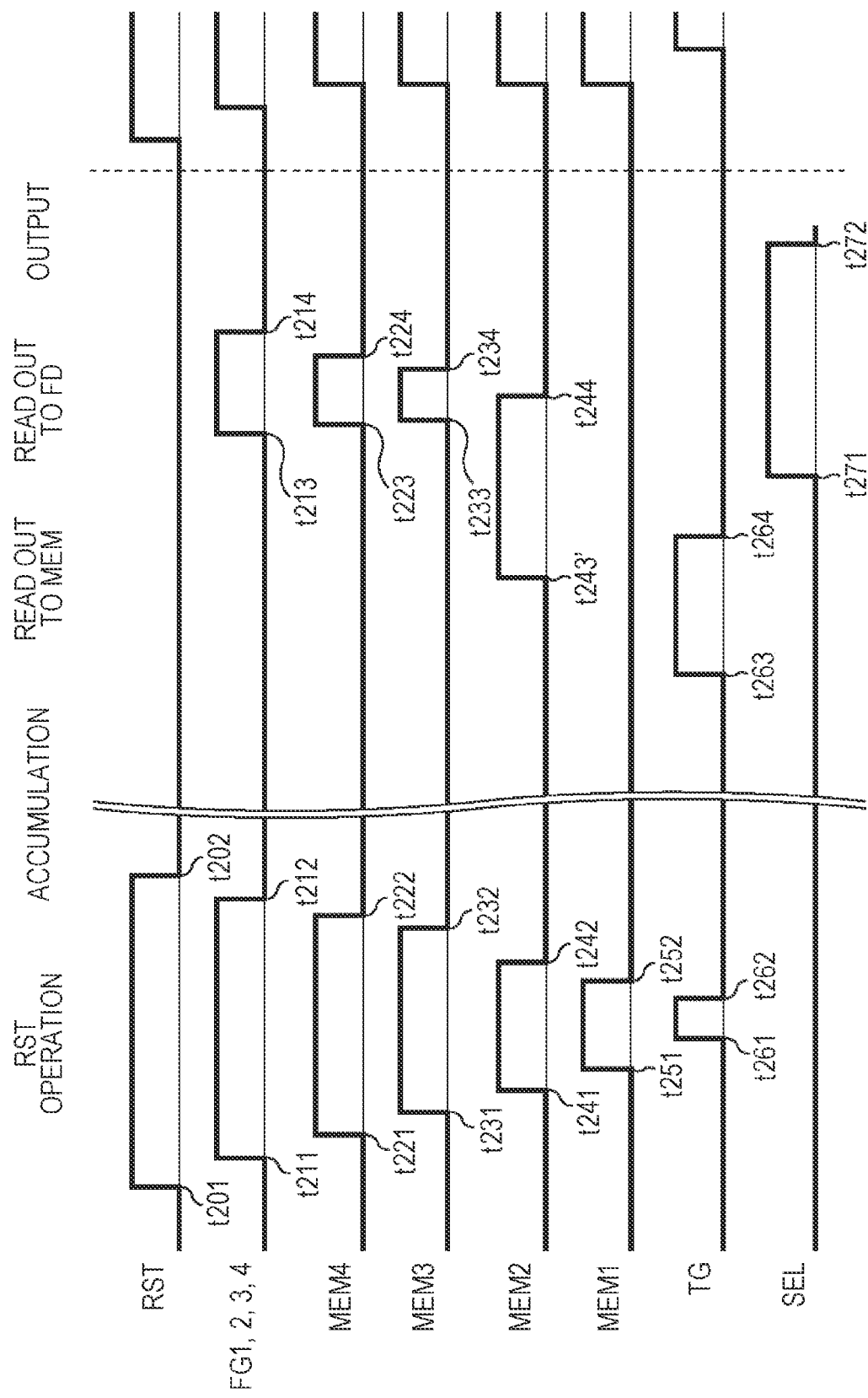
FIG. 18 is a timing chart illustrating another charge accumulation transmission process in a case where a pixel signal is output by addition for every four pixels, using the solid-state imaging device of FIG. 13.

Further, in the above, a description has been made of an example in which pixels accumulated by the first holding unit MEM1 are sequentially transmitted to the second holding unit MEM2 to the fourth holding unit MEM4 to thereby transmit charge by an amount which is evened off to a quarter of the amount of charge capable of being held as a whole, but only charge held in the second holding unit MEM2 may be transmitted. In this case, since processes of step S104 and step S109 are skipped, a state where the first holding unit MEM1 is not released is set as indicated by times t253 to t254 of FIG. 17. In addition, as shown in FIG. 18, a timing when the second holding unit MEM2 is turned on and then released, which is the process of step S106, is set to time t243' which is a timing between time t263 and time t264 when the transmission gate TG is turned on and then accumulated charge is transmitted from the photodiode PD. Thus, the charge held in the second holding unit MEM2 is sequentially transmitted to the floating diffusion FD through the third holding unit MEM3, the fourth holding unit MEM4, and the floating gate FG.

In addition, it is possible to realize a case where only charge held in the third holding unit MEM3 is transmitted through the fourth holding unit MEM4 and the floating diffusion FD, in a similar manner.

Figure 19:
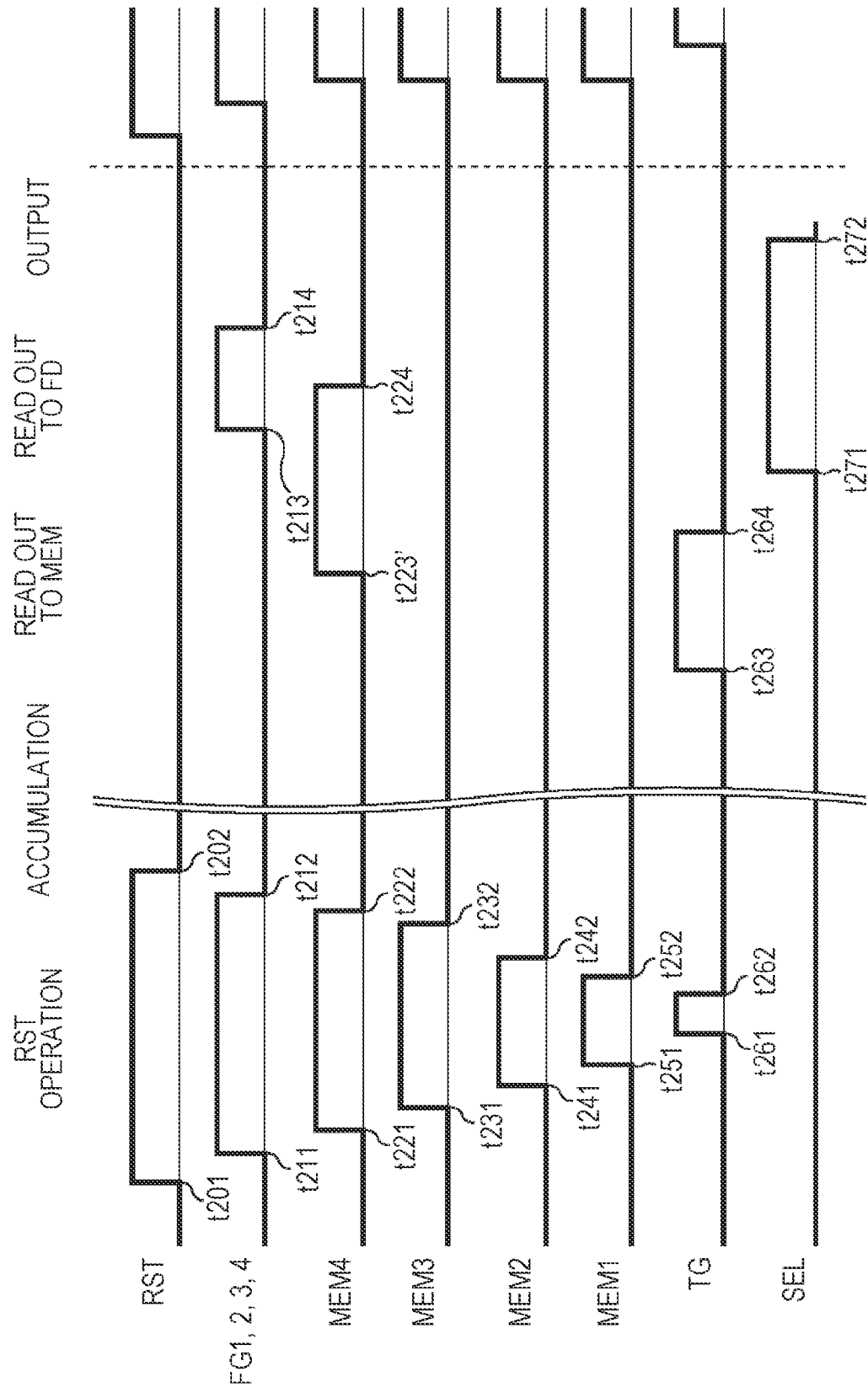
FIG. 19 is a timing chart illustrating another charge accumulation transmission process in a case where a pixel signal is output by addition for every four pixels, using the solid-state imaging device of FIG. 13.

Further, this is the same as in a case where only charge held in the fourth holding unit MEM4 is transmitted to the floating diffusion FD. That is, as shown in FIG. 19, a timing when the fourth holding unit MEM4 is turned on and then released may be set to time t223' which is a timing between the time t263 and the time t264 when the transmission gate TG is released. In addition, as a matter of course, all of the first holding unit MEM1 to the third holding unit MEM3 are not turned on after a reset operation.

As described above, it is possible to transmit charge to the floating diffusion FD by an amount which is evened off to a quarter of the amount of charge capable of being held in any one of the first holding unit MEM1 to the fourth holding unit MEM4 and to simultaneously read out pixel signals of four pixels at a high speed without reducing the light-receiving area.

Fifth Embodiment

Configuration Example and Circuit Configuration Example of Solid-State Imaging Device According to Fifth Embodiment In the above, a description has been made of an example in which all gates are opened to discharge charge accumulated in the photodiode PD to the reset drain RST Drain and then the accumulation of charge is started to sequentially transmit the accumulated charge to the floating diffusion FD through the first holding unit MEM1 to the fourth holding unit MEM4. However, in order to reset the charge accumulated in the photodiode PD, a separate gate may be provided so that the charge may be reset while being transmitted in a first holding unit MEM1 to a fourth holding unit MEM4.

Figure 20:
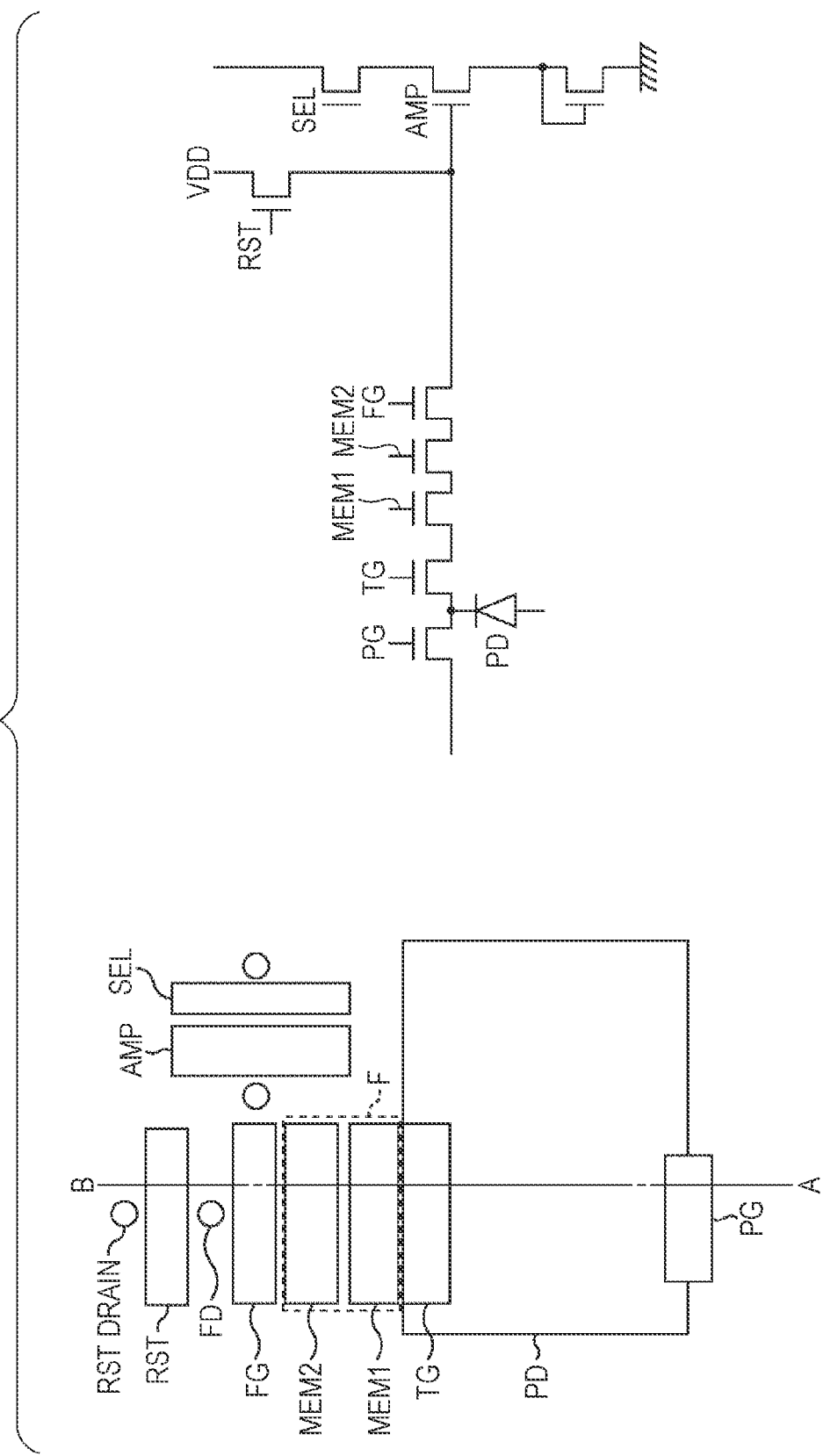
FIG. 20 is a diagram illustrating a configuration example of a solid-state imaging device according to a fifth embodiment to which the present disclosure is applied.

FIG. 20 shows a configuration example and a circuit configuration example of a solid-state imaging device in which a global reset gate PG capable of directly discharging accumulated charge to a reset drain RST Drain is provided in a photodiode PD. In the configuration example and the circuit configuration example of the solid-state imaging device of FIG. 20, components having the same functions as the components in the configuration example of the solid-state imaging device of FIG. 2 and the circuit configuration example of FIG. 3 will be given the same reference numerals, signs and names, and the description thereof will be appropriately omitted.

That is, the solid-state imaging device of FIG. 20 is different from the solid-state imaging devices of FIG. 2 and FIG. 3 in that the global reset gate PG is newly provided in the photodiode PD.

Figure 21:
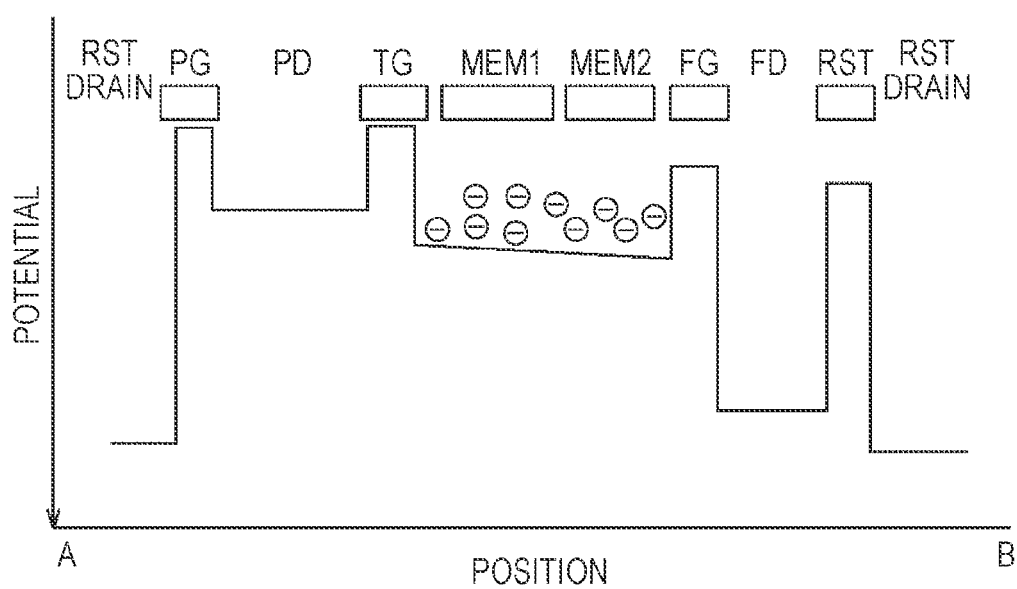
FIG. 21 is a diagram illustrating potential distribution of the solid-state imaging device of FIG. 20.

For example, the global reset gate PG is a hole-accumulation diode (HAD). The global reset gate has a function similar to that of an overflow discharge portion OFB as shown in FIG. 21 and directly discharges charge accumulated in the photodiode PD to the reset drain RST Drain adjacent thereto. That is, the global reset gate PG may discharge charge remaining in the photodiode PD to the reset drain RST Drain while the charge is transmitted in the first holding unit MEM1 to the fourth holding unit MEM4, thereby completing the reset operation. In addition, FIG. 21 shows potential distribution in a cross-section taken along line B-B' of FIG. 20.

Charge Accumulation Transmission Process Using Solid-State Imaging Device of FIG. 20

Figure 22:
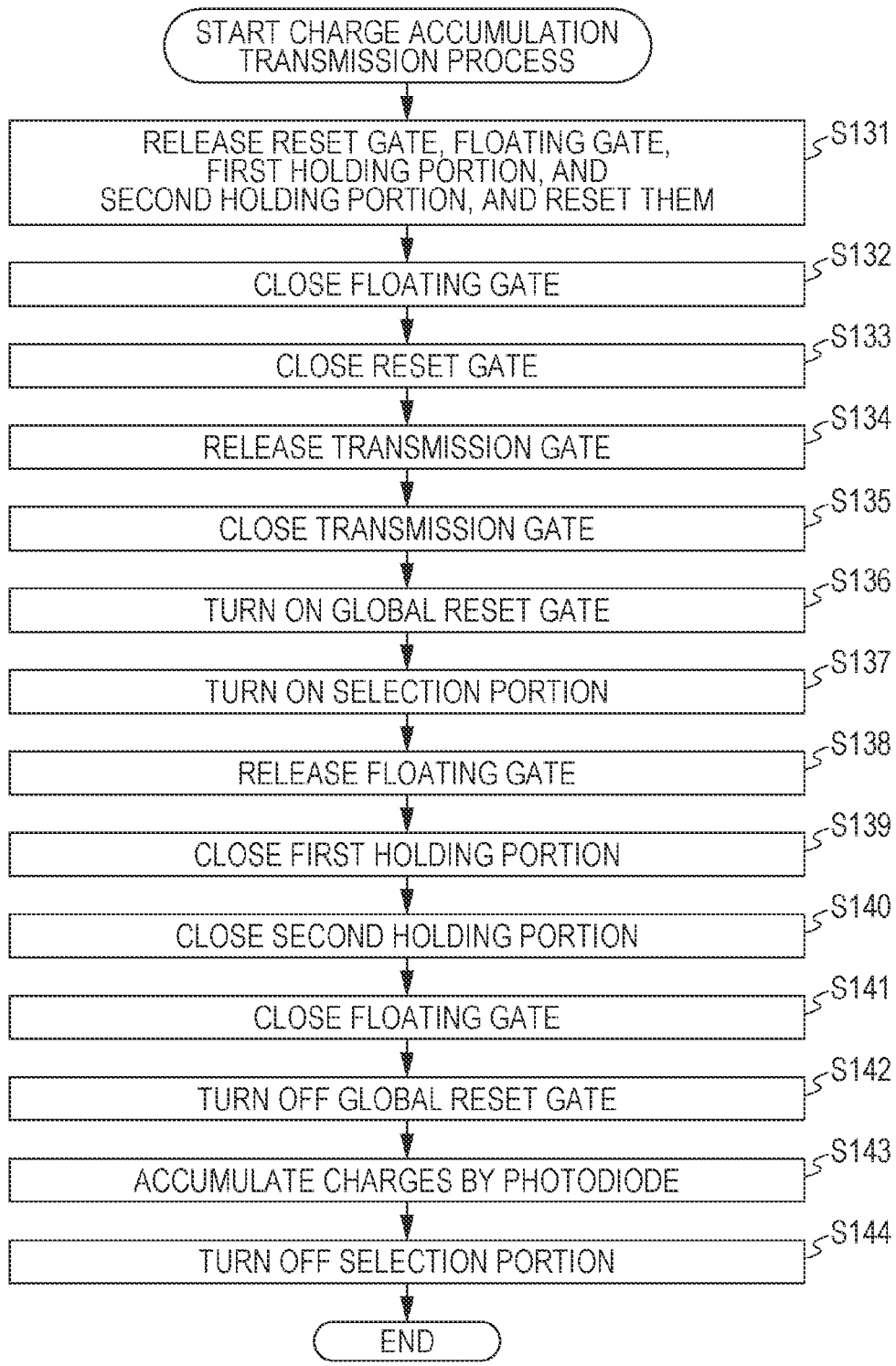
FIG. 22 is a flow chart illustrating a charge accumulation transmission process in a case where a pixel signal is output by addition for every four pixels, using the solid-state imaging device of FIG. 20.
Figure 23:
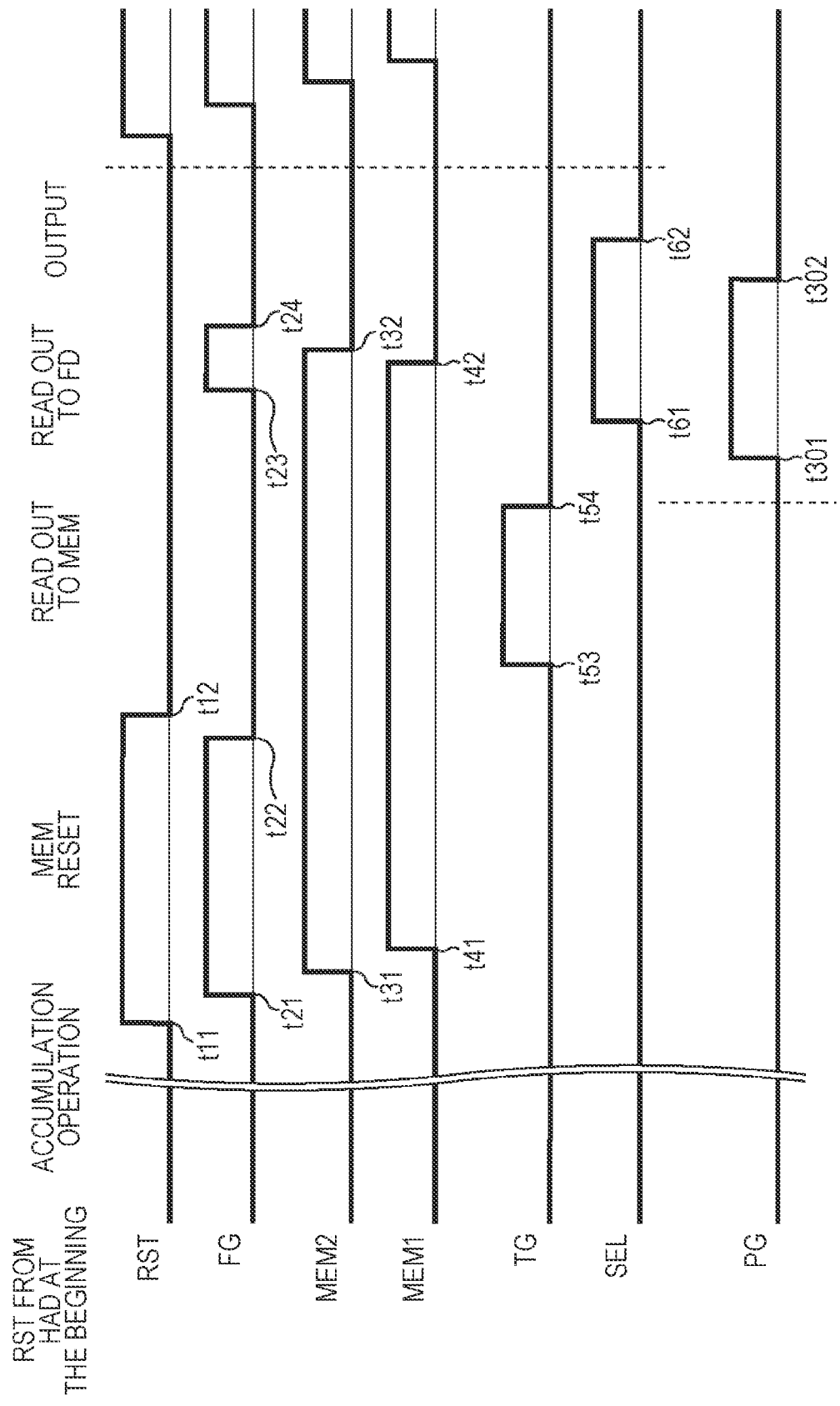
FIG. 23 is a timing chart illustrating the charge accumulation transmission process in a case where a pixel signal is output by addition for every four pixels, using the solid-state imaging device of FIG. 20.

Next, a charge accumulation transmission process of the solid-state imaging device of FIG. 20 will be described with reference to a flow chart of FIG. 22 and a timing chart of FIG. 23. In FIG. 23, a waveform indicating a control state of the global reset gate PG is shown on the lowermost stage, in addition to the waveform of FIG. 5.

In step S131, a reset gate RST, a floating gate FG, the second holding unit MEM2, and the first holding unit MEM1 are sequentially controlled to be turned on in this order, and thus the accumulated charge is released.

That is, as indicated by times t11, t21, t31, t41 of FIG. 23, the reset gate RST, the floating gate FG, the second holding unit MEM2, and the first holding unit MEM1 are controlled to be turned on, and thus the accumulated charge is released, thereby executing a reset operation.

In step S132, as indicated by time t22 of FIG. 23, the floating gate FG is turned off, and thus a state where the charge can be held in the first holding unit MEM1 and the second holding unit MEM2 is set.

In step S133, at time t12 of FIG. 23, the reset gate RST is turned off, and thus a state where the charge can be accumulated in the floating diffusion FD is set.

In step S134, as indicated by time t53 of FIG. 23, the transmission gate TG is controlled to be turned on, and thus the transmission gate TG is released. In the previous charge accumulation transmission process, the accumulation of the charge of the photodiode PD is completed by processes of steps S142 and S143 to be described later, and thus the charge accumulated in the photodiode PD is transmitted to the first holding unit MEM1 and the second holding unit MEM2. In addition, herein, waveforms at times t51 to t52 in the timing chart of FIG. 5 are not present. That is, in the solid-state imaging device of FIG. 22, since the global reset gate PG is present, the transmission gate TG is not desired to be released.

In step S135, as indicated by time t54 of FIG. 23, the transmission gate TG is controlled to be turned off, and thus the transmission gate TG is closed. As a result, the charge accumulated in the photodiode PD is read out to the first holding unit MEM1 and the second holding unit MEM2, and the charge is held in the first holding unit MEM1 and the second holding unit MEM2.

In step S136, as indicated by time t301 of FIG. 23, the global reset gate PG is controlled to be turned on, and the charge remaining in the photodiode PD is discharged to the reset drain RST Drain.

In step S137, as indicated by time t61 of FIG. 23, a selection unit SEL is turned on, and thus a state is set in which a voltage corresponding to the charge accumulated in the floating diffusion FD is output as a pixel signal from an amplification unit AMP. However, in this stage, since charge is not accumulated in the floating diffusion FD, there is no pixel signal to be output from the amplification unit AMP.

In step S138, as indicated by time t23 of FIG. 23, the floating gate FG is turned on and then released, and thus the charge held in the first holding unit MEM1 and the second holding unit MEM2 is read out to the floating diffusion FD.

In step S139, at time t42 of FIG. 23, the first holding unit MEM1 is turned off, and thus the first holding unit MEM1 is closed. That is, the first holding unit MEM1 is turned off (closed), and thus an electric field in an electrode of the second holding unit MEM2 is strengthened. Accordingly, the inclination of the potential becomes sharp, which leads to a state where the held charge has a tendency to be transmitted to the floating diffusion FD.

In step S140, at time t32 of FIG. 23, the second holding unit MEM2 is turned off, and thus the second holding unit MEM2 is closed. That is, the second holding unit MEM2 is turned off (closed), and thus a state where charge may not be held in any of the first holding unit MEM1 and the second holding unit MEM2 is set. Accordingly, the total amount of charge held is transmitted to the floating diffusion FD.

In step S141, at time t24 of FIG. 23, the floating gate FG is turned off (closed), and thus the transmission of the charge to the floating diffusion FD from the first holding unit MEM1 and the second holding unit MEM2 is terminated. At this time, since the selection unit SEL is set to be in an on state by the process of step S137, the amplification unit AMP amplifies a voltage supplied from a power source VDD in accordance with the amount of charge transmitted to the floating diffusion FD and then outputs a pixel signal.

In step S142, as indicated by time t302 of FIG. 23, the global reset gate PG is turned off (closed).

In step S143, since the global reset gate PG and the transmission gate TG are turned off (closed), the photodiode PD starts to accumulate charge.

In step S144, as indicated by time t62 of FIG. 23, the selection unit SEL is turned off, and thus the output from the amplification unit AMP is stopped.

Thereafter, since the reset operation has been already completed in the photodiode PD, it is possible to accumulate charge generated by photoelectric conversion according to light reception during the reset operation of the first holding unit MEM1 and the second holding unit MEM2.

As a result, the reset operation of the photodiode PD and the transmission of the charge to the floating diffusion FD in the first holding unit MEM1 and the second holding unit MEM2 are processed in parallel, and thus it is possible to realize the overall operation at a high speed and to improve a frame rate.

Sixth Embodiment

Configuration Example and Circuit Configuration Example of Solid-State Imaging Device according to Sixth Embodiment In the above, description has been made of an example in which the holding unit holding charge transmitted from the photodiode PD is constituted by electrodes which are equally divided, but the holding unit may be constituted by electrodes which are unequally divided.

Figure 24:
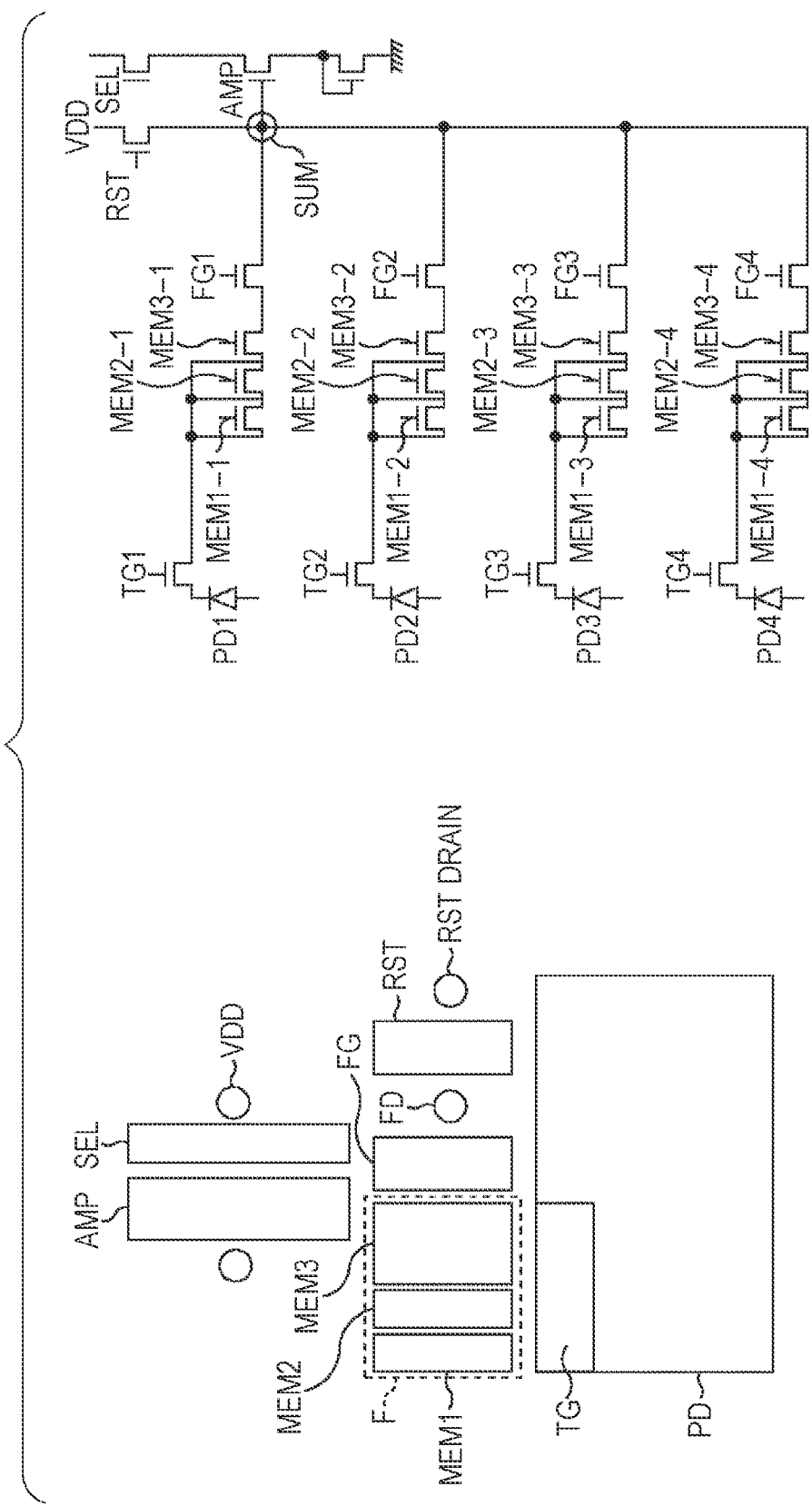
FIG. 24 is a diagram illustrating a configuration example of a solid-state imaging device according to a sixth embodiment to which the present disclosure is applied.

The left and right sides of FIG. 24 show a configuration example and a circuit configuration example of a solid-state imaging device that includes a first holding unit MEM1, a second holding unit MEM2, and a third holding unit MEM3 each which is constituted by electrodes which are unequally divided. In addition, in the configuration of the solid-state imaging device of FIG. 24, components having the same functions as those of the solid-state imaging device of FIG. 11 will be given the same reference numerals, signs and names, and the description thereof will be appropriately omitted.

That is, the solid-state imaging device of FIG. 24 is different from the solid-state imaging device of FIG. 11 in that electrodes are divided to have unequal areas in three holding units. That is, as shown on the left side of FIG. 24, the first holding unit MEM1 and the second holding unit MEM2 are divided to have areas which are substantially equal to each other. However, the third holding unit MEM3 has an area twice as large as those of the first holding unit MEM1 and the second holding unit MEM2.

In addition, as shown on the right side of FIG. 24, a photodiode PD1 is provided with a first holding unit MEM1-1 to a third holding unit MEM3-1, and a floating gate FG1. In addition, a photodiode PD2 is provided with a first holding unit MEM1-2 to a third holding unit MEM3-2, and a floating gate FG2. Further, a photodiode PD3 is provided with a first holding unit MEM1-3 to a third holding unit MEM3-3, and a floating gate FG3. In addition, a photodiode PD4 is provided with a first holding unit MEM1-4 to a third holding unit MEM3-4, and a floating gate FG4.

Further, an output of each of floating gates FG1 to FG4 is connected to an addition unit SUM constituted by a floating diffusion FD. The addition unit SUM adds charge serving as outputs of the floating gates FG1 to FG4 and then outputs the charge to a reset gate RST and an amplification unit AMP.

For example, as shown on the left side of FIG. 24, a third holding unit MEM3' constituted by an electrode having a relatively large area may be disposed in a range in which charge has a tendency to be transmitted with a short moving distance of the charge close to the floating gate FG which is a transmission destination. On the other hand, in a range in which charge has a tendency not to be transmitted with a long moving distance of the charge to the floating gate FG which is a transmission destination, the first holding unit MEM1 and the second holding unit MEM2 each which is constituted by an electrode having a relatively small area may be disposed. With such an arrangement, a strong electric field may be locally applied by a small electrode for a long range of a distance at which charge is to be transmitted, and the amount of charge capable of being transmitted by one control operation of turning-on or turning-off may be increased by a large electrode for a short range of a distance at which charge is to be transmitted.

In addition, the charge accumulation transmission process of the solid-state imaging device of FIG. 24 is similar to the process described with reference to the flow chart of FIG. 9 or FIG. 16 excluding the process regarding the second holding unit MEM2 or the third holding unit MEM3 in the first holding unit MEM1 to the fourth holding unit MEM4, and thus the description thereof will be omitted here.

Seventh Embodiment

Configuration Example and Circuit Configuration Example of Solid-State Imaging Device according to Seventh Embodiment In the above, a description has been made of an example in which the transmission of charge accumulated in the photodiode PD to the holding unit is controlled by the transmission gate TG. However, since the charge accumulated in the photodiode PD may be able to be transmitted to the holding unit, the transmission gate TG may be omitted and the transmission may be able to be directly controlled by turning-on or turning-off of the holding unit.

Figure 25:
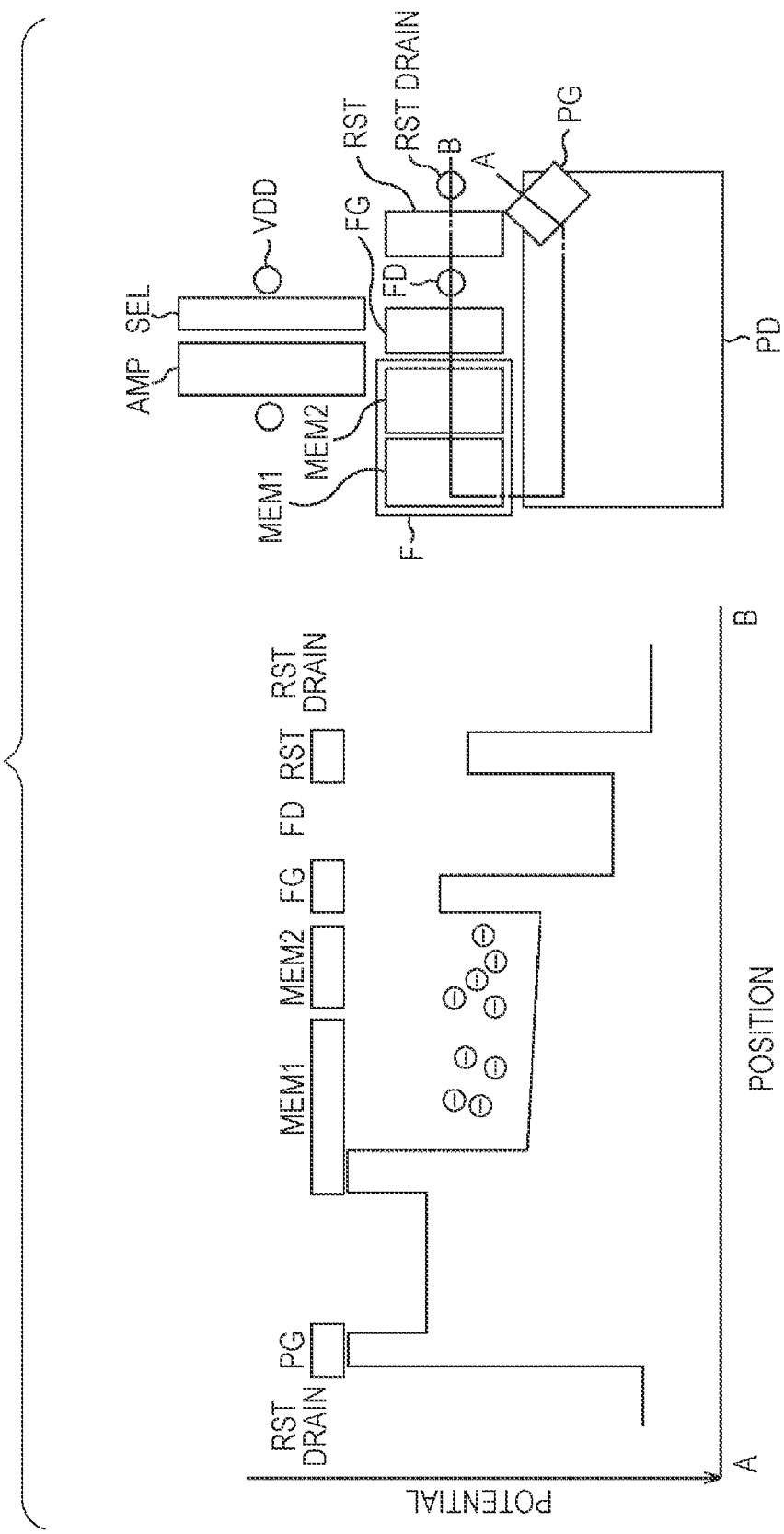
FIG. 25 is a diagram illustrating a configuration example of a solid-state imaging device according to a seventh embodiment to which the present disclosure is applied.

The right side of FIG. 25 shows a configuration example of a solid-state imaging device in which a transmission gate TG is omitted and the transmission of charge accumulated in a photodiode PD can be controlled by turning-on or turning-off of a first holding unit MEM1. In addition, the left side of FIG. 25 shows potential distribution in a cross-section taken along line A-B which is indicated by a dotted line of the right side of FIG. 25. In the configuration of the solid-state imaging device of FIG. 25, components having the same functions as those of the solid-state imaging device of FIG. 20 will be given the same reference numerals, signs and names, and the description thereof will be appropriately omitted.

That is, the solid-state imaging device of FIG. 25 is different from the solid-state imaging device of FIG. 20 in that the photodiode PD is disposed in a direction in which the first holding unit MEM1 and the second holding unit MEM2 are divided in FIG. 20, whereas the photodiode PD is disposed in a direction perpendicular to the direction in which the first holding unit MEM1 and a second holding unit MEM2 are divided in FIG. 25. Further, there is a difference in that a transmission gate TG is omitted and a global reset gate PG is connected to a reset drain RST Drain in the same pixel. Therefore, in the drawing on the left side of FIG. 25, the reset drain RST Drain on the left side is identical to that on the right side. Further, the first holding unit MEM1 and the second holding unit MEM2 of FIG. 25 have a function with an operation of the transmission gate TG.

In more detail, the first holding unit MEM and the second holding unit MEM2 of FIG. 25 are controlled by three values, for example, +6 V, 0 V, and −3 V. In this case, when the voltage is +6 V, the first holding unit MEM and the second holding unit MEM2 release a gate at a boundary with the photodiode PD to transmit accumulated charge to themselves. In addition, when the voltage is 0 V, the first holding unit MEM and the second holding unit MEM2 are set to be in a state where the gate at the boundary with the photodiode PD is closed and the charge can be held.

Further, when the voltage is −3 V, the first holding unit MEM and the second holding unit MEM2 are set to be in a closed state, and thus transmit held charge to the floating diffusion FD through the floating gate FG.

Charge Accumulation Transmission Process Using Solid-State Imaging Device of FIG. 25

Figure 26:
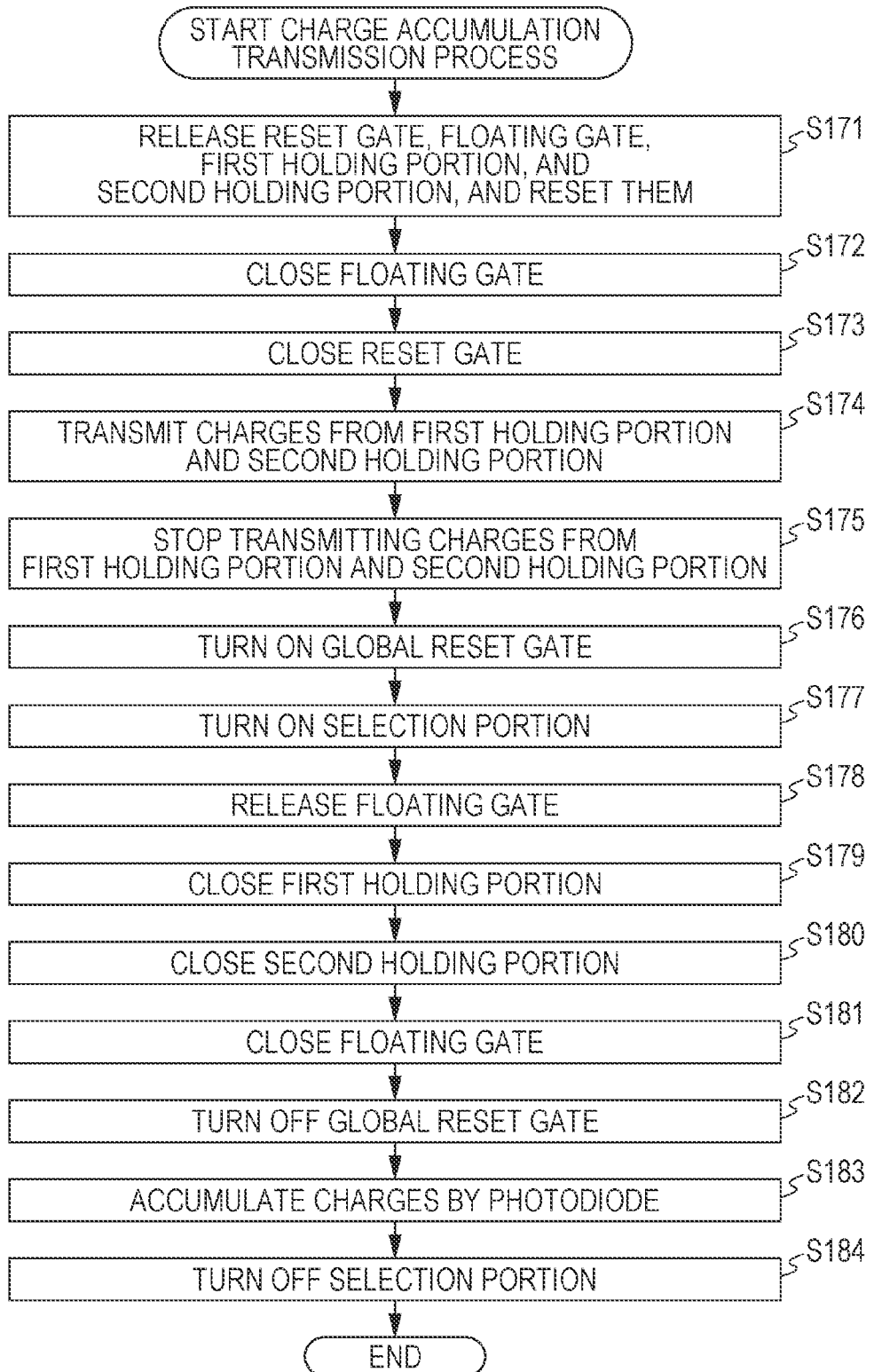
FIG. 26 is a flow chart illustrating a charge accumulation transmission process using the solid-state imaging device of FIG. 25.
Figure 27:
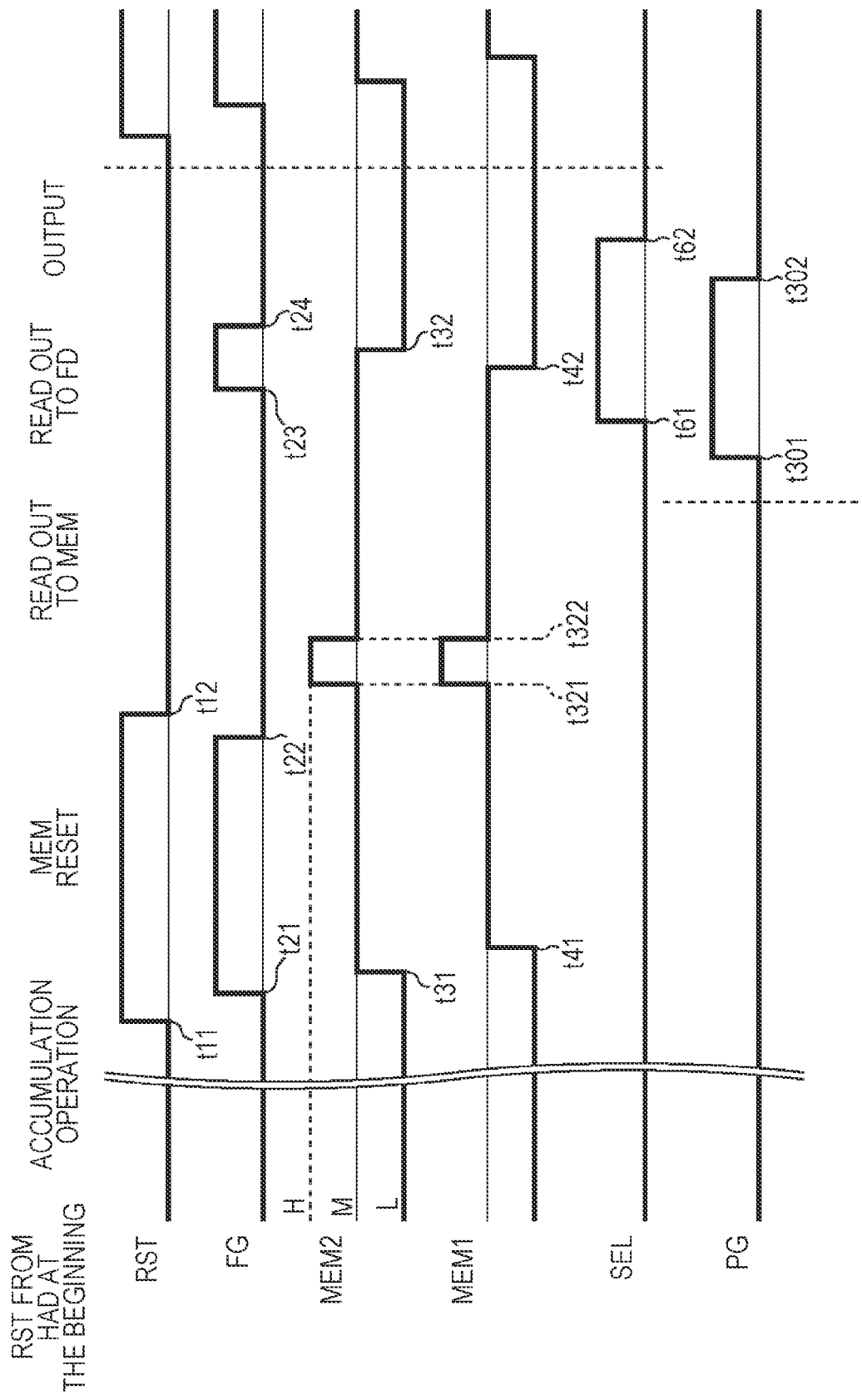
FIG. 27 is a timing chart illustrating the charge accumulation transmission process using the solid-state imaging device of FIG. 25.

Next, a charge accumulation transmission process of the solid-state imaging device of FIG. 25 will be described with reference to a flow chart of FIG. 26 and a timing chart of FIG. 27. FIG. 27 shows a control state at a timing of the turning-on (High) or turning-off (Low) of each of the reset gate RST, the floating gate FG, the selection unit SEL, and the global reset gate PG. Further, FIG. 25 shows control states of H (High) equivalent to +6 V, M (Middle) equivalent to 0 V, and L (Low) equivalent to −3 V which are described above in the second holding unit MEM2 and the first holding unit MEM1.

In addition, this process is based on the premise that the global reset gate PG is turned on and then released to discharge charge of the photodiode PD to the reset drain RST Drain and that the global reset gate is turned off to set a state where the charge can be accumulated, by the previous process.

In step S171, the reset gate RST, the floating gate FG, the second holding unit MEM2, and the first holding unit MEM1 are sequentially controlled to be turned on, and thus held charge is released.

That is, as shown in FIG. 27, at times t11 and t21, the reset gate RST and the floating gate FG are turned on. Further, at times t31 and t41, the second holding unit MEM2 and the first holding unit MEM1 are controlled to be in the state of Middle. In this state, the first and second holding unit MEM1 and MEM2 are closed with respect to the photodiode PD but are open with respect to the reset drain RST Drain, and thus the accumulated charge in the first and second holding unit MEM1 and MEM2 is released through the reset drain RST Drain, thereby executing a reset operation for the floating diffusion FD and the first and second holding unit MEM1 and MEM2.

In step S172, as indicated by time t22 of FIG. 27, the floating gate FG is turned off, and thus a state where the charge can be held in the first holding unit MEM1 and the second holding unit MEM2 is set.

In step S173, at time t12 of FIG. 27, the reset gate RST is turned off, and thus a state where the charge can be accumulated in the floating diffusion FD is set.

In step S174, as indicated by time t321 of FIG. 27, the first holding unit MEM1 and the second first holding unit MEM2 are controlled to be in the state of High, and thus the boundary with the photodiode PD is released (opened). As a result, the charge accumulated in the photodiode PD is transmitted to the first holding unit MEM1 and the second holding unit MEM2.

In step S175, as indicated by time t322 of FIG. 27, the first holding unit MEM1 and the second first holding unit MEM2 are controlled to be in the state of Middle, and thus the boundary with the photodiode PD is closed. As a result, the transmission of the charge from the photodiode PD is stopped.

In step S176, as indicated by time t301 of FIG. 27, the global reset gate PG is turned on (opened), and thus the charge accumulated in the photodiode PD is discharged to the reset drain RST Drain.

In step S177, as indicated by time t61 of FIG. 27, the selection unit SEL is turned on, and thus a state is set in which a voltage corresponding to the charge accumulated in the floating diffusion FD is output from the amplification unit AMP. However, in this stage, since charge is not accumulated in the floating diffusion FD, there is no pixel signal to be output from the amplification unit AMP.

In step S178, as indicated by time t23 of FIG. 27, the floating gate FG is turned on (opened), and thus the charge held in the first holding unit MEM1 and the second holding unit MEM2 is read out to the floating diffusion FD.

In step S179, at time t42 of FIG. 27, the first holding unit MEM1 is set to be in the state of Low, and thus the first holding unit MEM1 is closed. That is, the first holding unit MEM1 is set to be in the state of Low (closed), and thus the electric field in the electrode of the second holding unit MEM2 is strengthened. Accordingly, the inclination of the potential becomes sharp, which leads to a state where the held charge has a tendency to be transmitted to the floating diffusion FD.

In step S180, at time t32 of FIG. 27, the second holding unit MEM2 is set to be in the state of Low, and thus the second holding unit MEM2 is closed. That is, the second holding unit MEM2 is set to be in the state of Low and closed, and thus a state where charge may not be held in any of the first holding unit MEM1 and the second holding unit MEM2 is set. Accordingly, the total amount of charge held is transmitted to the floating diffusion FD.

In step S181, at time t24 of FIG. 27, the floating gate FG is turned off (closed), and thus the transmission of the charge to the floating diffusion FD from the first holding unit MEM1 and the second holding unit MEM2 is terminated. At this time, since the selection unit SEL is set to be in an on state by the process of step S177, the amplification unit AMP amplifies a voltage supplied from a power source VDD in accordance with the amount of charge transmitted to the floating diffusion FD and then outputs a pixel signal.

In step S182, as indicated by time t302 of FIG. 27, the global reset gate PG is turned off (closed).

In step S183, the photodiode PD is set to be in a state where the charge can be accumulated by the process of step S182.

In step S184, as indicated by time t62 of FIG. 27, the selection unit SEL is turned off, and thus the output from the amplification unit AMP is stopped.

As described above, the first holding unit MEM1 and the second holding unit MEM2 can be provided with the function of the transmission gate TG, and thus it is possible to hold charge transmitted from the photodiode PD in two of the first holding unit MEM1 and the second holding unit MEM2 even when the transmission gate TG is omitted and to read out the charge so that the second holding unit MEM2 is turned off after the first holding unit MEM1 is turned off. As a result, even in a configuration in which the transmission gate TG is omitted, the held charge is more reliably read out to the floating diffusion FD.

Electrode Configuration

Next, electrode configurations of the first holding unit MEM1 and the second holding unit MEM2 in the solid-state imaging device of FIG. 25 will be described.

Figure 28:
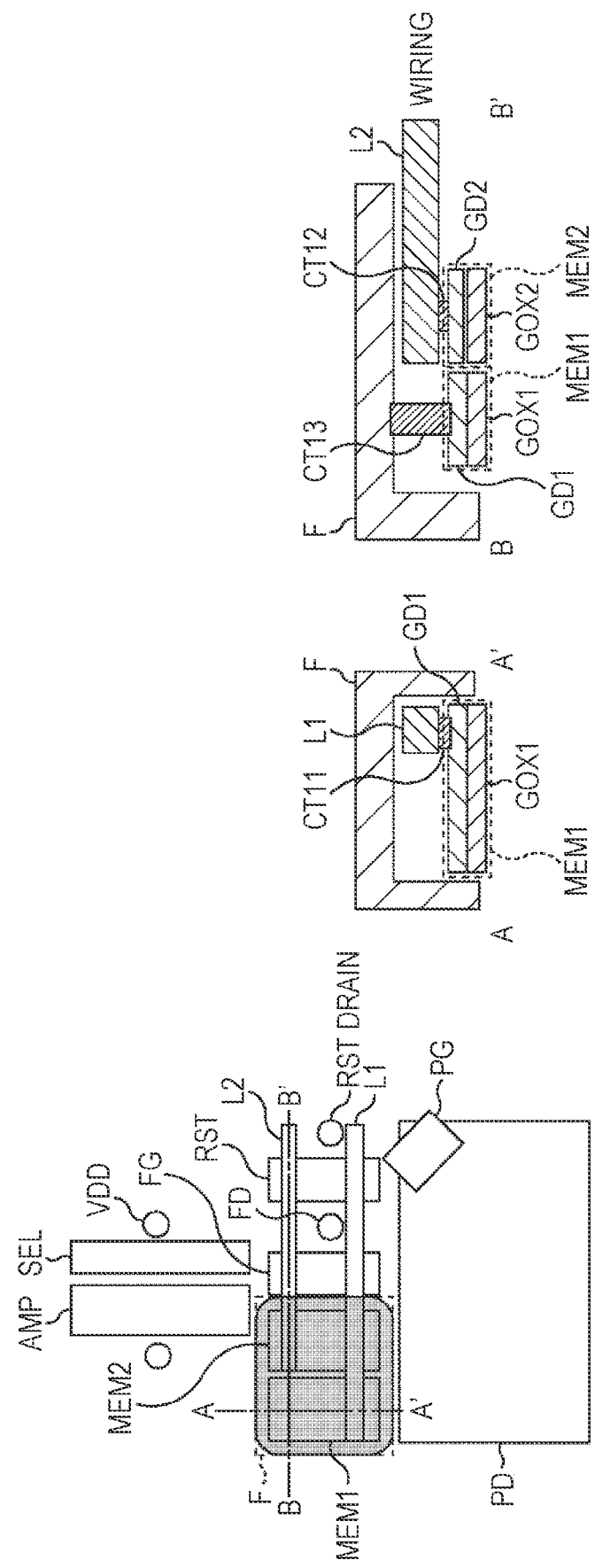
FIG. 28 is a diagram illustrating a configuration example of a wiring in a solid-state imaging device of the related art.

When the first holding unit MEM1 and the second holding unit MEM2 are configured as shown in FIG. 25, a wiring is connected as shown in FIG. 28 in the related art. In FIG. 28, a left side shows a top view, a middle side shows a cross-sectional view taken along line A-A' of the left side, and a right side shows a cross-sectional view taken along line B-B' of the left side.

That is, the first holding unit MEM1 is constituted by a stack of a gate electrode GD1 and gate oxide film GOX1, and the second holding unit MEM is constituted by a stack of a gate electrode GD2 and gate oxide film GOX2. A wiring L1 is connected to the gate electrode GD1 through a contact CT11, and the turning-on and turning-off of the first holding unit MEM1 are controlled by power supplied from the wiring L1. In addition, a wiring L2 is connected to the gate electrode GD2 through a contact CT12, and the turning-on and turning-off of the second holding unit MEM2 are controlled by power supplied from the wiring L2. Incidentally, a light shielding film F is further connected to the gate electrode GD1 of the first holding unit MEM1 through a contact CT13.

That is, the light shielding film F is formed of a metal, and thus it is possible to omit the wiring L1 by using the light shielding film F instead of the wiring L1.

Figure 29:
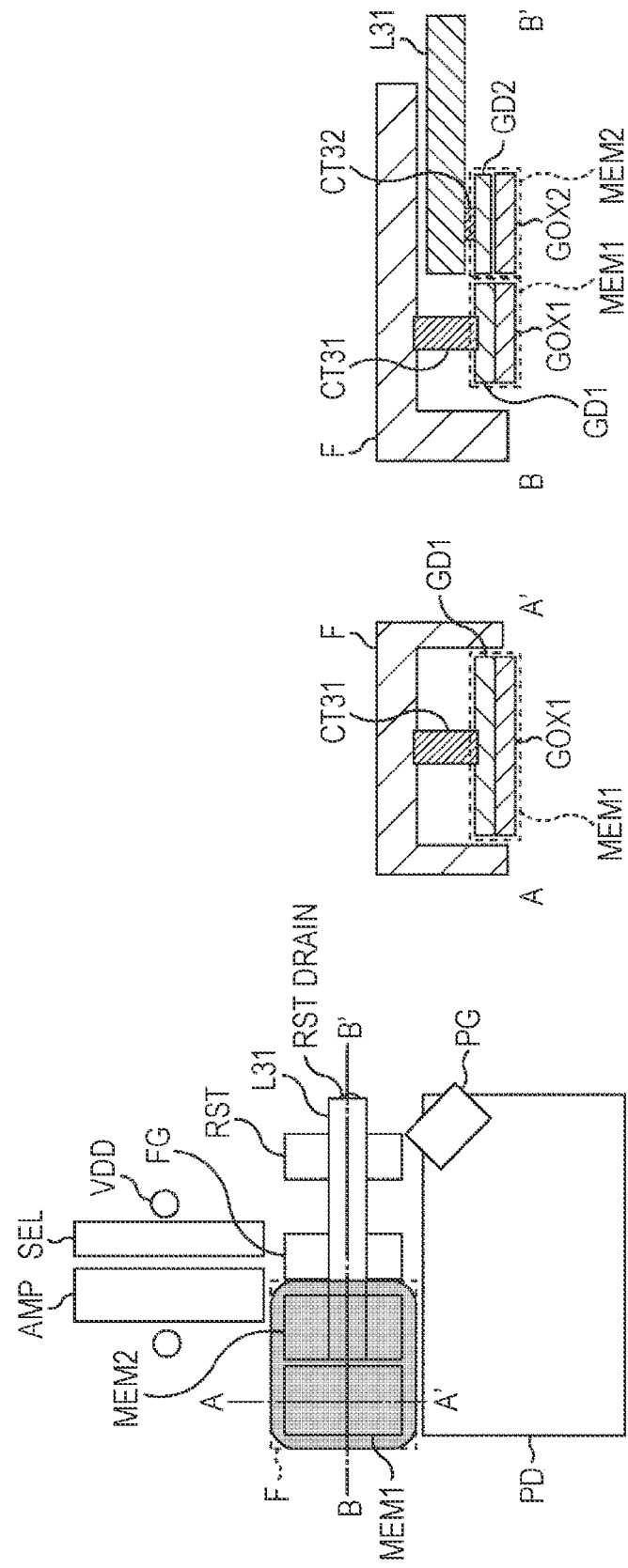
FIG. 29 is a diagram illustrating a configuration example of a wiring in the solid-state imaging device to which the present disclosure is applied.

FIG. 29 shows the configuration of a solid-state imaging device in which a wiring is omitted by using the light shielding film F instead of the wiring L1. That is, in this example, the light shielding film F is connected to the first holding unit MEM1 through a contact CT31. In addition, a wiring L31 is connected to the second holding unit MEM2 through a contact CT32. In this manner, the light shielding film F functions as a portion of a wiring, and thus it is possible to increase the amount of light incident on the photodiode PD, and the degree of freedom in routing the wiring is improved.

In addition, a memory gate material constituting the gate oxide film GOX is a material in which high dielectric materials such as SiN, $HfO_2$, and $TaO_2$ are laminated in addition to $SiO_2$.

Further, examples of an electrode material constituting the gate electrode GD include Poly Si, PDAS, a metal material, and the like. In addition, it is possible to reduce the thickness of the light shielding film by adopting the metal material as the electrode material. In addition, W, Mo, Al, Cu, and the like which have a high extinction coefficient are preferably used as the material of the light shielding film.

In addition, such a wiring configuration may be applied to the above-described solid-state imaging devices according to the first embodiment to the sixth embodiment.

In addition, the embodiments of the present disclosure are not limited to the above-described embodiments, and various modifications can be made without departing from the scope of the present disclosure.

For example, the steps described in the above-described flow charts can be performed not only using one device but also using a plurality of devices for sharing.

Further, when one step includes a plurality of processes, the plurality of processes included in the one step can be performed not only using one device but also using a plurality of devices for sharing.

In addition, the present disclosure can also adopt the following configuration.

(1) A solid-state imaging device including:
a photodiode that receives light in pixel units and generates charge by photoelectric conversion; and
a holding unit that includes electrodes divided into a plurality of pieces and temporarily holds the charge generated by the photodiode,
wherein the holding unit sequentially switches turning-on or turning-off of the divided electrodes to thereby transmit the held charge to a floating diffusion.

(2) The solid-state imaging device according to (1), wherein the solid-state imaging device is a global shutter type solid-state imaging device.

(3) The solid-state imaging device according to (1) or (2), further including an addition unit that adds the charge transmitted from the holding units of the plurality of pixels,
wherein charge accumulated in a portion of the electrodes divided into a plurality of pieces is transmitted to the floating diffusion, and wherein the addition unit adds the charge accumulated in the portion of the electrodes divided into a plurality of pieces by the plurality of pixels and then transmits the charge.

(4) The solid-state imaging device according to any one of (1) and (3), further including a read-out electrode which is constituted by an electrode that controls the transmission of the charge generated by the photodiode to the holding unit, wherein the read-out electrode is configured in a direction perpendicular to a division direction of the electrodes divided into a plurality of pieces, which constitute the holding unit.

(5) The solid-state imaging device according to any one of (1) to (4), wherein the plurality of divided electrodes constituting the holding unit are divided so as to have substantially equal areas.

(6) The solid-state imaging device according to any one of (1) to (4), wherein the plurality of divided electrodes constituting the holding unit are divided so as to have unequal areas.

(7) The solid-state imaging device according to any one of (1) to (6), wherein the holding unit has a function of transmitting the charge generated by the photodiode to itself.

(8) The solid-state imaging device according to any one of (1) to (5), further including a global reset gate that controls turning-on or turning-off for directly discharging the charge of the photodiode to a reset drain.

(9) The solid-state imaging device according to any one of (1) to (8), wherein the holding unit includes $SiO_2$, SiN, $HfO_2$, or $TaO_2$ and is formed by a stack thereof.

(10) The solid-state imaging device according to any one of (1) to (9), wherein a material of the electrode is a metal material including Poly Si, PDAS, W, Mo, Al, or Cu.

(11) The solid-state imaging device according to any one of (1) to (10), wherein the holding unit further includes a light-shielding unit, and wherein any one of the electrodes divided into a plurality of pieces is shorted from the light-shielding unit.

(12) A method of operating a solid-state imaging device, the method including:

causing a photodiode to receive light in pixel units and to generate charge by photoelectric conversion; and causing a holding unit with electrodes divided into a plurality of pieces to temporarily hold the charge generated by the photodiode, wherein the holding unit sequentially switches turning-on or turning-off of the divided electrodes to thereby transmit the held charge to a floating diffusion.

(13) An electronic apparatus having a solid-state imaging device, the electronic apparatus including:

a photodiode that receives light in pixel units and generates charge by photoelectric conversion; and a holding unit that includes electrodes divided into a plurality of pieces and temporarily holds the charge generated by the photodiode, wherein the holding unit sequentially switches turning-on or turning-off of the divided electrodes to thereby transmit the held charge to a floating diffusion.

(14) The electronic apparatus according to (13), wherein the solid-state imaging device is a global shutter type solid-state imaging device.

(15) The electronic apparatus according to (13) or (14), further including an addition unit that adds the charge transmitted from the holding units of the plurality of pixels, wherein charge accumulated in a portion of the electrodes divided into a plurality of pieces is transmitted to the floating diffusion, and wherein the addition unit adds the charge accumulated in the portion of the electrodes divided into a plurality of pieces by the plurality of pixels and then transmits the charge.

(16) The electronic apparatus according to any one of (13) to (15), further including a read-out electrode which is constituted by an electrode that controls the transmission of the charge generated by the photodiode to the holding unit, wherein the read-out electrode is configured in a direction perpendicular to a division direction of the electrodes divided into a plurality of pieces, which constitute the holding unit.

(17) The electronic apparatus according to any one of (13) to (16), wherein the plurality of divided electrodes constituting the holding unit are divided so as to have substantially equal areas.

(18) The electronic apparatus according to any one of (13) to (16), wherein the plurality of divided electrodes constituting the holding unit are divided so as to have unequal areas.

(19) The electronic apparatus according to any one of (13) to (19), wherein the holding unit has a function of transmitting the charge generated by the photodiode to itself.

(20) A method of operating an electronic apparatus having a solid-state imaging device, the method including:

causing a photodiode to receive light in pixel units and to generate charge by photoelectric conversion; and causing a holding unit with electrodes divided into a plurality of pieces to temporarily hold the charge generated by the photodiode, wherein the holding unit sequentially switches turning-on or turning-off of the divided electrodes to thereby transmit the held charge to a floating diffusion.

It should be understood by those skilled in the art that various modifications, combinations, sub-combinations and alterations may occur depending on design requirements and other factors insofar as they are within the scope of the appended claims or the equivalents thereof.

(21) An imaging device, comprising:

a plurality of pixels in a two-dimensional array, each including:

a photoelectric conversion element that converts incident light into an electric charge; and a charge holding element that receives the electric charge from the photoelectric conversion element, and transfers the electric charge to a corresponding floating diffusion, wherein, for each of the plurality of pixels, the charge holding element includes a plurality of electrodes.

(22) The imaging device of any one of (21) through (37), further comprising:

a control circuit that controls operations of the plurality of pixels, wherein the control circuit is configured to cause the charge holding element of a given pixel of the plurality of pixels to transfer the electric charge held therein to the corresponding floating diffusion by sequentially supplying an OFF potential to the plurality of electrodes of the given pixel.

(23) The imaging device of any one of (21) through (37), further comprising:

a control circuit that controls operations of the plurality of pixels, wherein the control circuit is configured to drive the plurality of pixels to perform a global shutter imaging operation.

(24) The imaging device of any one of (21) through (37), wherein the plurality of pixels are grouped into units each comprising j pixels, j being an integer greater than 1, where each of the pixels that is included in a same unit corresponds to a same floating diffusion.

(25) The imaging device of any one of (21) through (37), further comprising:
a control circuit that controls operations of the plurality of pixels,
wherein the control circuit is configured to cause a given unit to perform an additive readout operation that includes transferring the electric charges held in the respective charge holding elements of each of the pixels of the given unit to the corresponding floating diffusion such that the corresponding floating diffusion adds together the electric charges transferred from the pixels of the given unit.

(26) The imaging device of any one of (21) through (37), further comprising:
a control circuit that controls operations of the plurality of pixels,
wherein the control circuit is configured to cause a given unit to perform a partial additive readout operation including:
for each of the pixels of the given unit, turning on less than all of the plurality of electrodes of the charge holding element of the respective pixel while the charge holding element of the respective pixel receives the electric charge from the photoelectric conversion element of the respective pixel, and
transferring the electric charges held in the respective charge holding elements of each of the pixels of the given unit to the corresponding floating diffusion such that the corresponding floating diffusion adds together the electric charges transferred from the pixels of the given unit.

(27) The imaging device of any one of (21) through (37), further comprising:
a control circuit that controls operations of the plurality of pixels,
wherein the control circuit is configured selectively read out a given unit according to one of a plurality of readout modes that the control circuit is configured to selectively switch between, the plurality of readout modes including:
an individual pixel readout mode in which the electric charge of the charge holding element of each pixel of the given unit is read out individually,
an additive readout mode in which the electric charge of the charge holding element of each pixel of the given unit is added together by the corresponding floating diffusion and read out collectively, and
a partial additive readout mode in which, for each of the pixels of the given unit, less than all of the plurality of electrodes of the charge holding element of the respective pixel are turned on while the charge holding element of the respective pixel receives the electric charge from the photoelectric conversion element of the respective pixel and the electric charge of the charge holding element of each pixel of the given unit is added together by the corresponding floating diffusion and read out collectively.

(28) The imaging device of any one of (21) through (37), further comprising:
a control circuit that controls operations of the plurality of pixels,
wherein the control circuit is configured to cause a given pixel of the plurality of pixels to perform a partial readout operation that includes turning on less than all of the plurality of electrodes of the charge holding element of the given pixel while the charge holding element of the given pixel receives the electric charge from the photoelectric conversion element of the given pixel.

(29) The imaging device of any one of (21) through (37), wherein each of the plurality of pixel includes a first transfer gate that selectively electrically separates the photoelectric conversion element of the respective pixel from the charge holding element of the respective pixel, and a second transfer gate that selectively electrically separates the charge holding element of the respective pixel from the corresponding floating diffusion.

(30) The imaging device of any one of (21) through (37), wherein, for each of the plurality of pixels:
the charge holding element includes a plurality of sub-regions each corresponding to one of the plurality of electrodes, and
the plurality of sub-regions are arranged in series between the first and second transfer gates.

(31) The imaging device of any one of (21) through (37), wherein, for each of the plurality of pixels:
the charge holding element includes a plurality of sub-regions each corresponding to one of the plurality of electrodes, and
the plurality of sub-regions are arranged such that each adjoins the photoelectric conversion element of the respective pixel with no other one of the plurality of sub-regions intervening therebetween.

(32) The imaging device of any one of (21) through (37), wherein, for each of the plurality of pixels, the plurality of sub-regions are arranged such that a first direction is transverse to a second direction,
the first direction is a direction in which charge is transferred into the charge holding element through the first transfer gate, and
the second direction is a direction in which charge is transferred out from the charge holding element through the second transfer gate.

(33) The imaging device of any one of (21) through (37), wherein, for each of the plurality of pixels:
the charge holding element includes a plurality of sub-regions each corresponding to one of the plurality of electrodes,
the plurality of sub-regions are arranged such that a first direction is transverse to a second direction,
the first direction is a direction in which charge is transferred into the charge holding element, and
the second direction is a direction in which charge is transferred out from the charge holding element.

(34) The imaging device of any one of (21) through (37), wherein the charge holding element of each of the plurality of pixels is configured such that at least one of the plurality of electrodes thereof also controls transfer of the electric charge from the photoelectric conversion element of the respective pixel to the charge holding element of the respective pixel.

(35) The imaging device of any one of (21) through (37), wherein, for a given pixel of the plurality of pixels, at least one of the plurality of electrodes of the charge holding element thereof is a different size from at least one other of the plurality of electrodes of the charge holding element thereof.

(36) The imaging device of any one of (21) through (37), wherein each of the plurality of pixels further includes a photoelectric-conversion-element-reset gate that abuts the photoelectric conversion element and selectively connects the photoelectric conversion element to a reset drain.

(37) The imaging device of any one of (21) through (36), wherein each of the plurality of pixels further includes a light shielding unit configured to shield the charge holding element from the incident light, and an electrode of at least one of the holding units is directly electrically connected to the light shielding unit.

(38) A method of driving an imaging device that includes a plurality of pixels that each include a photoelectric conversion element that converts incident light into an electric charge and a charge holding element that receives the electric charge from the photoelectric conversion element, temporarily holds the electric charge, and transfers the electric charge to a corresponding floating diffusion, where for each of the plurality of pixels, the charge holding element includes a plurality of electrodes, the method comprising:

causing the charge holding element of a given pixel of the plurality of pixels to transfer the electric charge held therein to the corresponding floating diffusion by sequentially turning off the plurality of electrodes of the charge holding element of the given pixel.

(39) The method of (38), further comprising:
turning on less than all of the plurality of electrodes of the given pixel while the electric charge is received from the photoelectric conversion element by the charge holding element.

(40) An electronic apparatus comprising an imaging device that includes a plurality of pixels in a two-dimensional array, each including:

a photoelectric conversion element that converts incident light into an electric charge; and a charge holding element that receives the electric charge from the photoelectric conversion element, and transfers the electric charge to a corresponding floating diffusion, wherein, for each of the plurality of pixels, the charge holding element includes a plurality of electrodes.

(41) An electronic apparatus comprising the imaging device of any one of (21) through (37).

What is claimed is:

1. A light detecting device, comprising:
a plurality of pixels, respectively including:
a photoelectric conversion unit,
a first charge holding unit,
a first transistor disposed between the photoelectric conversion unit and the first charge holding unit, and
a second transistor disposed adjacent to the photoelectric conversion unit, the second transistor including, as a gate, an overflow discharge portion.

2. The imaging device according to claim 1, wherein each of the plurality of pixels further includes a floating diffusion adjacent to a second charge holding unit.

3. The imaging device according to claim 2, wherein the first transistor is configured to transfer a charge from the photoelectric conversion unit to the first charge holding unit.

4. The imaging device according to claim 1, wherein the first charge holding unit is one of a plurality of first charge holding units respectively corresponding to the pixels, and further comprising:
a wiring unit coupled to the plurality of first charge holding units via a plurality of contacts.

5. The imaging device according to claim 4, wherein the wiring unit comprises a first wiring coupled to the plurality of first charge holding units via a first contact of the plurality of contacts, and a second wiring coupled to the plurality of first charge holding units via a second contact of the plurality of contacts.

6. The imaging device according to claim 5, wherein:
the plurality of first charge holding units comprises a first gate electrode, and
the first wiring is coupled to the first gate electrode via the first contact.

7. The imaging device according to claim 6, wherein:
the plurality of first charge holding units comprises a second gate electrode, and
the second wiring is coupled to the second gate electrode via the second contact.

8. The imaging device according to claim 4, wherein the wiring unit provides power to transfer a charge accumulated at the photoelectric conversion unit to the plurality of first charge holding units.

9. The imaging device according to claim 1, further comprising:
a control circuit configured to control operations of the plurality of pixels, and to drive the plurality of pixels to perform a global shutter imaging operation.

10. The imaging device according to claim 1, wherein the second transistor abuts the photoelectric conversion unit and is configured to selectively connect the photoelectric conversion unit to a reset drain.

11. The imaging device according to claim 1, wherein the first charge holding unit is one of a plurality of first charge holding units respectively corresponding to the pixels, and further comprising:
a light shielding unit configured to shield the plurality of first charge holding units from an incident light.

12. The imaging device according to claim 1, wherein the first charge holding unit is one of a plurality of first charge holding units respectively corresponding to the pixels, and the plurality of first charge holding units is a plurality of capacitors arranged in series.

13. The imaging device according to claim 12, wherein each of the plurality of pixels further includes a floating diffusion adjacent to a second charge holding unit.

14. The imaging device according to claim 13, wherein the first transistor is configured to transfer a charge from the photoelectric conversion unit to the first charge holding unit.

15. The imaging device according to claim 12, wherein the first charge holding unit is one of a plurality of first charge holding units respectively corresponding to the pixels, and further comprising:
a wiring unit coupled to the plurality of first charge holding units via a plurality of contacts.

16. The imaging device according to claim 15, wherein the wiring unit comprises a first wiring coupled to the plurality of first charge holding units via a first contact of the plurality of contacts, and a second wiring coupled to the plurality of first charge holding units via a second contact of the plurality of contacts.

17. The imaging device according to claim 16, wherein:
the plurality of first charge holding units comprises a first gate electrode, and
the first wiring is coupled to the first gate electrode via the first contact.

18. The imaging device according to claim 17, wherein:
the plurality of first charge holding units comprises a second gate electrode, and
the second wiring is coupled to the second gate electrode via the second contact.

19. The imaging device according to claim 16, wherein the wiring unit provides power to transfer a charge accumulated at the photoelectric conversion unit to the plurality of first charge holding units.

* * * * *